(12) United States Patent
Sun et al.

(10) Patent No.: US 11,191,068 B2
(45) Date of Patent: Nov. 30, 2021

(54) PER TRANSMISSION CONFIGURATION CHANNEL SENSING

(71) Applicant: QUALCOMM Incorporated, San Diego, CA (US)

(72) Inventors: Jing Sun, San Diego, CA (US); Xiaoxia Zhang, San Diego, CA (US); Tao Luo, San Diego, CA (US); Makesh Pravin John Wilson, San Diego, CA (US); Arumugam Chendamarai Kannan, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 16/680,272

(22) Filed: Nov. 11, 2019

(65) Prior Publication Data
US 2020/0154414 A1 May 14, 2020

Related U.S. Application Data

(60) Provisional application No. 62/759,985, filed on Nov. 12, 2018.

(51) Int. Cl.
*H04W 72/04* (2009.01)
*H04W 24/08* (2009.01)
(Continued)

(52) U.S. Cl.
CPC ......... *H04W 72/042* (2013.01); *H04L 1/1812* (2013.01); *H04L 5/0055* (2013.01);
(Continued)

(58) Field of Classification Search
CPC . H04W 72/042; H04W 24/08; H04W 72/085; H04W 72/14; H04W 72/0446; H04L 1/1812; H04L 5/0055
See application file for complete search history.

(56) References Cited

U.S. PATENT DOCUMENTS

| 11,083,018 B2* | 8/2021 | Xu ......................... H04W 48/16 |
| 2010/0318871 A1* | 12/2010 | Lee ........................ H04L 1/1816 714/749 |

(Continued)

FOREIGN PATENT DOCUMENTS

| EP | 2658146 A2 | 10/2013 |
| WO | 2010110598 A2 | 9/2010 |

OTHER PUBLICATIONS

Partial International Search Report—PCT/US2019/060869—ISA/EPO—Apr. 23, 2020.
(Continued)

*Primary Examiner* — Michael J Moore, Jr.
(74) *Attorney, Agent, or Firm* — Patterson + Sheridan, L.L.P.

(57) ABSTRACT

Certain aspects of the present disclosure provide techniques for per transmission configuration channel sensing. A method for wireless communication by a user equipment (UE) generally includes monitoring a plurality of dummy physical downlink control channel (PDCCH) transmissions from at least one base station (BS). The dummy PDCCH transmissions use a different transmission configuration. The UE sends acknowledgment feedback for the plurality of dummy PDCCH transmission. The ACK feedback for the dummy PDCCH transmissions may be multiplexed with ACK feedback to the at least one BS for physical downlink shared channel (PDSCH) transmissions. A UE may receive a configuration reserving one or more bits in a UE codebook for providing the ACK feedback. Each reserved bit may be
(Continued)

for control resource sets associated with a transmission configuration. The UE monitors PDDCH transmissions using different transmission configurations and uses the reserved bits to transmit ACK feedback for the PDCCH transmissions.

29 Claims, 17 Drawing Sheets

(51) Int. Cl.
*H04W 72/08* (2009.01)
*H04L 5/00* (2006.01)
*H04L 1/18* (2006.01)
*H04W 72/14* (2009.01)

(52) U.S. Cl.
CPC ......... *H04W 24/08* (2013.01); *H04W 72/085* (2013.01); *H04W 72/14* (2013.01); *H04W 72/0446* (2013.01)

(56) References Cited

U.S. PATENT DOCUMENTS

| | | | | |
|---|---|---|---|---|
| 2014/0036889 | A1* | 2/2014 | Kim | H04W 72/0446 370/336 |
| 2015/0304925 | A1 | 10/2015 | Hwang et al. | |
| 2018/0070341 | A1 | 3/2018 | Islam et al. | |
| 2019/0075597 | A1* | 3/2019 | Yerramalli | H04W 74/0816 |
| 2019/0132882 | A1* | 5/2019 | Li | H04L 27/26132 |
| 2019/0342035 | A1* | 11/2019 | Zhang | H04L 1/0073 |
| 2020/0029315 | A1* | 1/2020 | Lin | H04L 5/0091 |
| 2020/0084789 | A1* | 3/2020 | Wang | H04L 1/1812 |
| 2020/0106569 | A1* | 4/2020 | Tsai | H04L 5/0055 |
| 2020/0146063 | A1* | 5/2020 | Xu | H04W 74/0808 |
| 2020/0162207 | A1* | 5/2020 | Hwang | H04L 1/18 |
| 2020/0288479 | A1* | 9/2020 | Xi | H04B 7/02 |
| 2020/0295878 | A1* | 9/2020 | Choi | H04L 1/18 |
| 2020/0344761 | A1* | 10/2020 | Amuru | H04L 5/0007 |
| 2020/0367253 | A1* | 11/2020 | Kim | H04W 72/0493 |
| 2020/0374960 | A1* | 11/2020 | Deenoo | H04W 72/14 |
| 2020/0389847 | A1* | 12/2020 | Deng | H04B 7/0617 |
| 2021/0028893 | A1* | 1/2021 | Hwang | H04L 5/0055 |
| 2021/0044392 | A1* | 2/2021 | Myung | H04L 5/0044 |

OTHER PUBLICATIONS

Huawei., et al., "Solution and TP for Multi-TRP PDCCH Transmission," 3GPP Draft, R1-1800824, 3GPP TSG RAN WG1 Ad Hoc Meeting, (3GPP), Mobile Competence Centre, 650, Route Des Lucioles, F-06921 Sophia-Antipolis Cedex, France, vol. RAN WG1, No. Vancouver, Canada; 20180122-20180126, Jan. 13, 2018, XP051385096, 5 Pages, Retrieved from the Internet: URL: http://www.3gpp.org/ftp/tsg%5Fran/WG1%5FRL1/TSGR1%5FAH/NR%5FAH%5F1801/Docs/ Paragraph [002]-Paragraph [02.5].

International Search Report and Written Opinion—PCT/US2019/060869—ISA/EPO—Jul. 31, 2020.

Nokia., et al., "Remaining Details on Multi-TRP Transmission," 3GPP Draft, 3GPP TSG RAN WG1 NR Ad Hoc #3, R1-1716494, 3rd Generation Partnership Project (3GPP), Mobile Competence Centre, 650, Route Des Lucioles, F-06921, Sophia-Antipolis Cedex, France, vol. RAN WG1, No. Nagoya, Japan, 20170918-20170921, Sep. 17, 2017, XP051339947, 6 Pages, Retrieved from the Internet: URL: http://www.3gpp.org/ftp/Meetings_3GPP_SYNC/RAN1/Docs/ p. 3-p. 4. Paragraph [001]-Paragraph [002].

\* cited by examiner

PER TRANSMISSION CONFIGURATION CHANNEL SENSING

CROSS-REFERENCE TO RELATED APPLICATION(S)

This application claims benefit of and priority to U.S. Provisional Patent Application Ser. No. 62/759,985, filed Nov. 12, 2018, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for per transmission configuration channel sensing.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment (UE). The method generally includes monitoring a plurality of dummy physical downlink control channel (PDCCH) transmissions from at least one base station (BS). The plurality of dummy PDCCH transmissions use different transmission configurations. The method generally includes sending acknowledgment (ACK) feedback to the at least one BS for the plurality of dummy PDCCH transmissions.

Certain aspects provide a method for wireless communication by a BS. The method generally includes sending a plurality of dummy PDCCH transmissions to a UE for channel sensing. The plurality of dummy PDCCH transmissions use different transmission configurations. The method generally includes receiving ACK feedback from the UE for the plurality of dummy PDCCH transmissions.

Certain aspects provide a method for wireless communication by a UE. The method generally includes receiving a configuration reserving one or more bits in a UE codebook for providing ACK feedback. Each reserved bit is for one or more control resource sets (coresets) associated with a same transmission configuration. The method generally includes monitoring a plurality of PDCCH transmissions from at least one BS. The plurality of PDCCH transmissions use different transmission configurations. The method generally includes using the reserved bits to transmit ACK feedback to the at least one BS for the plurality of PDCCH transmissions.

Certain aspects provide a method for wireless communication by a BS. The method generally includes configuring a UE with one or more reserved bits in a UE codebook for providing ACK feedback. Each reserved bit is for one or more coresets associated with a same transmission configuration. The method generally includes sending a plurality of PDCCH transmissions to the UE. The plurality PDCCH transmissions use different transmission configurations. The method generally includes receiving ACK feedback from the UE, for the plurality of PDCCH transmissions, via the reserved bits.

Certain aspects provide an apparatus for wireless communication. The apparatus generally includes a memory and at least one processor coupled with the memory. The at least one processor is generally configured to monitor a plurality of dummy PDCCH transmissions from at least one other apparatus. The plurality of dummy PDCCH transmission use different transmission configurations. The at least one processor is generally configured to send ACK feedback to the at least one other apparatus for the plurality of dummy PDCCH transmissions.

Certain aspects provide an apparatus for wireless communication. The apparatus generally includes a memory and at least one processor coupled with the memory. The at least one processor is generally configured to send a plurality of dummy PDCCH transmissions to another apparatus for channel sensing. The plurality of dummy PDCCH transmission use different transmission configurations. The at least one processor is generally configured to receive ACK feedback from the other apparatus for the plurality of dummy PDCCH transmissions.

Certain aspects provide an apparatus for wireless communication. The apparatus generally includes a memory and at least one processor coupled with the memory. The at least one processor is generally configured to receive a configuration reserving one or more bits in a UE codebook for providing ACK feedback. Each reserved bit is for one or more coresets associated with a same transmission configuration. The at least one processor is generally configured to monitor a plurality of PDCCH transmissions from at least one other apparatus. The plurality of PDCCH transmissions use different transmission configurations. The at least one processor is generally configured to use the reserved bits to transmit ACK feedback to the at least one other apparatus for the plurality of PDCCH transmissions.

Certain aspects provide an apparatus for wireless communication. The apparatus generally includes a memory and at least one processor coupled with the memory. The at least one processor is generally configured to configure another apparatus with one or more reserved bits in a UE codebook for providing ACK feedback. Each reserved bit is for one or more coresets associated with a same transmission configuration. The at least one processor is generally configured to send a plurality of PDCCH transmissions to the other apparatus. The plurality of PDCCH transmission use different transmission configurations. The at least one processor is generally configured to receive ACK feedback from the other apparatus, for the plurality of PDCCH transmissions, via the reserved bits.

Certain aspects provide an apparatus for wireless communication. The apparatus generally includes means for monitoring a plurality of dummy PDCCH transmissions from at least one other apparatus. The plurality of dummy PDCCH transmission use different transmission configurations. The apparatus generally includes means for sending ACK feedback to the at least one other apparatus for the plurality of dummy PDCCH transmissions.

Certain aspects provide an apparatus for wireless communication. The apparatus generally includes means for sending a plurality of dummy PDCCH transmissions to another apparatus for channel sensing. The plurality of dummy PDCCH transmission use different transmission configurations. The apparatus generally includes means for receiving ACK feedback from the other apparatus for the plurality of dummy PDCCH transmissions.

Certain aspects provide an apparatus for wireless communication. The apparatus generally includes means for receiving a configuration reserving one or more bits in a UE codebook for providing ACK feedback. Each reserved bit is for one or more coresets associated with a same transmission configuration. The apparatus generally includes means for monitoring a plurality of PDCCH transmissions from at least one other apparatus. The plurality of PDCCH transmissions use different transmission configurations. The apparatus generally includes means for using the reserved bits to transmit ACK feedback to the at least one other apparatus for the plurality of PDCCH transmissions.

Certain aspects provide an apparatus for wireless communication. The apparatus generally includes means for configuring another apparatus with one or more reserved bits in a UE codebook for providing ACK feedback. Each reserved bit is for one or more coresets associated with a same transmission configuration. The apparatus generally includes means for sending a plurality of PDCCH transmissions to the other apparatus. The plurality of PDCCH transmission use different transmission configurations. The apparatus generally includes means for receiving ACK feedback from the other apparatus, for the plurality of PDCCH transmissions, via the reserved bits.

Certain aspects provide a computer readable medium having computer executable code stored thereon for wireless communication. The computer readable medium generally includes code for monitoring a plurality of dummy PDCCH transmissions from at least one BS. The plurality of dummy PDCCH transmission use different transmission configurations. The computer readable medium generally includes code for sending ACK feedback to the at least one BS for the plurality of dummy PDCCH transmissions.

Certain aspects provide a computer readable medium having computer executable code stored thereon for wireless communication. The computer readable medium generally includes code for sending a plurality of dummy PDCCH transmissions to a UE for channel sensing. The plurality of dummy PDCCH transmission use different transmission configurations. The computer readable medium generally includes code for receiving ACK feedback from the UE for the plurality of dummy PDCCH transmissions.

Certain aspects provide a computer readable medium having computer executable code stored thereon for wireless communication. The computer readable medium generally includes code for receiving a configuration reserving one or more bits in a UE codebook for providing ACK feedback. Each reserved bit is for one or more coresets associated with a same transmission configuration. The computer readable medium generally includes code for monitoring a plurality of PDCCH transmissions from at least BS. The plurality of PDCCH transmissions use different transmission configurations. The computer readable medium generally includes code for using the reserved bits to transmit ACK feedback to the at least one BS for the plurality of PDCCH transmissions.

Certain aspects provide a computer readable medium having computer executable code stored thereon for wireless communication. The computer readable medium generally includes code for configuring a UE with one or more reserved bits in a UE codebook for providing ACK feedback. Each reserved bit is for one or more coresets associated with a same transmission configuration. The computer readable medium generally includes code for sending a plurality of PDCCH transmissions to the UE. The plurality of PDCCH transmission use different transmission configurations. The computer readable medium generally includes code for receiving ACK feedback from the UE, for the plurality of PDCCH transmissions, via the reserved bits.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
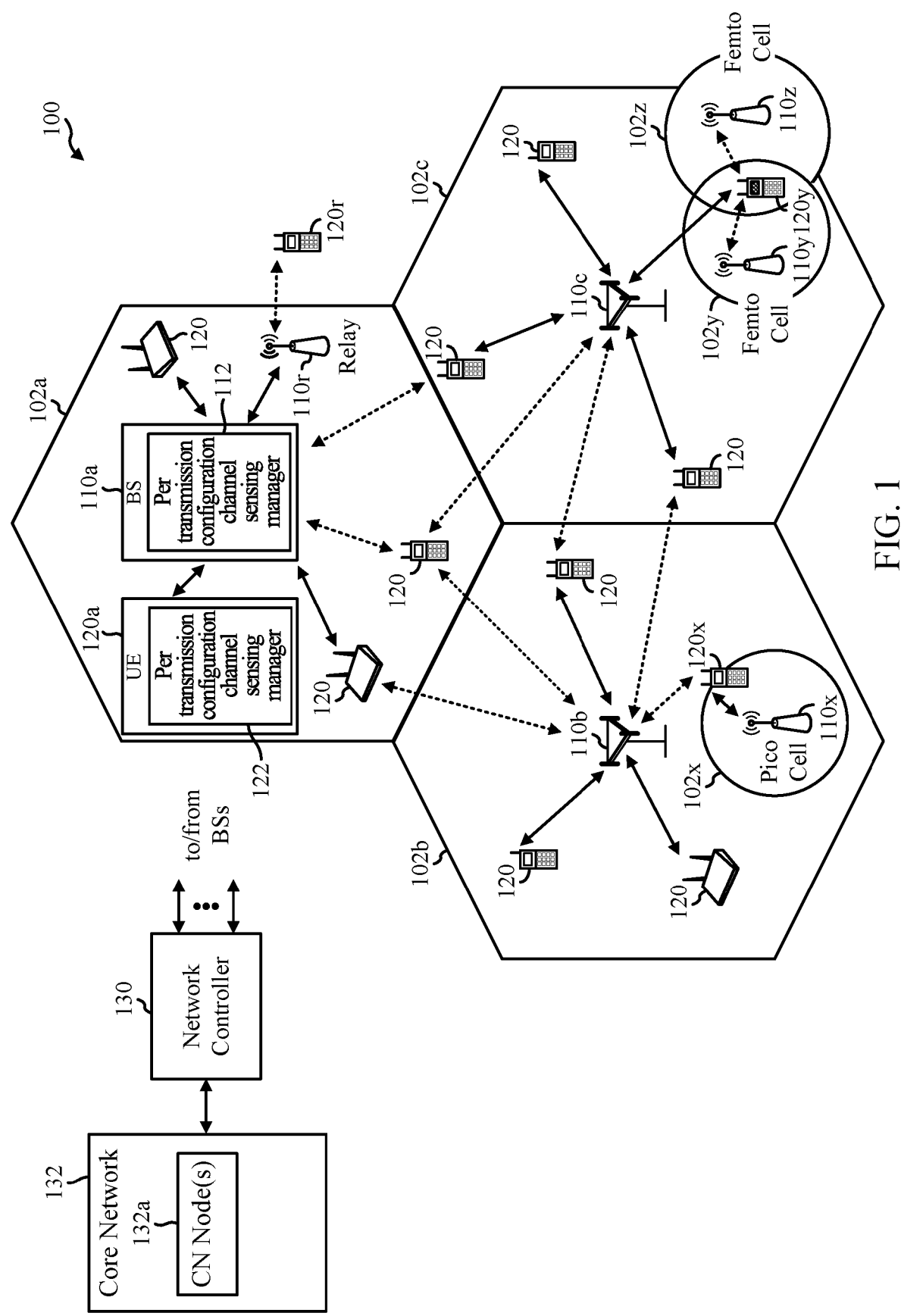
FIG. 1 is a block diagram conceptually illustrating an example telecommunications system, in accordance with certain aspects of the present disclosure.

Aspects of the present disclosure provide apparatus, methods, processing systems, and computer readable mediums for per transmission configuration channel sensing. In some examples, per transmission configuration channel sensing can be done with a dynamic hybrid automatic repeat request (HARQ) codebook using dummy physical downlink control channel (PDCCH) transmissions for different transmission configurations. The dummy PDCCH trigger HARQ feedback but do not carry a grant. The user equipment (UE) can send the feedback for the dummy PDCCHs at a corresponding dynamic downlink assignment index (DAI) location in the codebook. In some examples, specific bits can be reserved in a semi-static or dynamic UE HARQ codebook for providing feedback for different transmission configurations.

The following description provides examples of per transmission configuration channel sensing, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

The techniques described herein may be used for various wireless networks and radio technologies. While aspects may be described herein using terminology commonly associated with 3G, 4G and/or 5G wireless technologies, aspects of the present disclosure can be applied in other generation-based communication systems, including later technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

FIG. 1 illustrates an example wireless communication network 100 in which aspects of the present disclosure may be performed. As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 100. In some examples, the BSs 110 may be interconnected to one another and/or to one or more other BSs or network nodes in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110. The network controller 130 may communicate with the BSs 110 via a backhaul.

The BSs 110 communicate with UEs 120a-y (each also individually referred to herein as UE 120 or collectively as UEs 120) in the wireless communication network 100. The UEs 120 may be dispersed throughout the wireless communication network 100, and each UE 120 may be stationary or mobile.

Wireless communication network 100 may also include relay stations (e.g. relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120 to facilitate communication between devices.

In some examples, the wireless communication network 100 may be is a NR network. The BSs 110 and UEs 120 may be configured for per transmission configuration sensing. A BS 110a in the wireless communication network 100 includes a per transmission configuration channel sensing manager 112. The per transmission configuration channel sensing manager 112 may be configured to transmit a plurality of dummy PDCCH transmissions to the UE 120a in the wireless communication network 100. The plurality of dummy PDCCH transmissions use different transmission configurations. The UE 120a includes a per transmission configuration channel sensing manager 122. The per transmission configuration channel sensing manager 122 is configured to monitor the dummy PDCCH transmissions and send the BS 110a ACK feedback for the plurality of dummy PDCCH transmissions. In some examples, the per transmission configuration channel sensing manager 122 is configured to multiplex the ACK feedback for the dummy PDCCH transmissions with ACK feedback for physical downlink shared channel (PDSCH) transmissions.

In some examples, per transmission configuration channel sensing manager 112 configures, and the per transmission configuration channel sensing manager 122 receives, reserved bits in a UE codebook for providing ACK feedback. Each reserved bit for one or more control resource sets (coresets) associated with a same transmission configuration. In this case, the per transmission configuration channel sensing manager 122 uses the reserved bits to transmit ACK feedback to the BS 110a for PDCCH transmissions associated with different transmission configurations.

Figure 2:
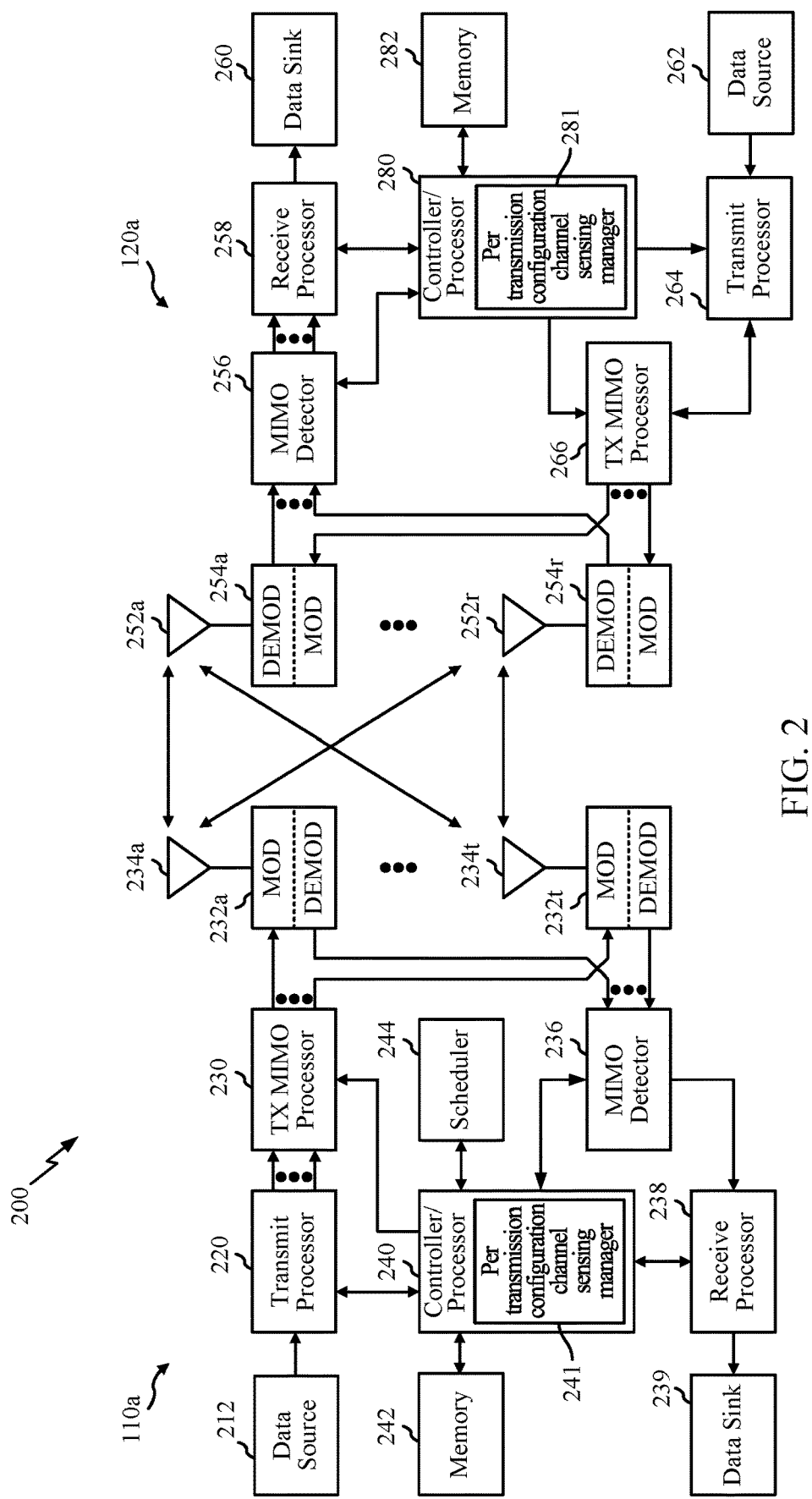
FIG. 2 is a block diagram conceptually illustrating a design of an example base station (BS) and user equipment (UE), in accordance with certain aspects of the present disclosure.

FIG. 2 illustrates example components of BS 110a and UE 120a (as depicted in FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), PDCCH, group common PDCCH (GC PDCCH), etc. The data may be for the physical downlink shared channel (PDSCH), etc. The processor 220 may process (e.g., encode and symbol map) the data and control information to obtain data symbols and control symbols, respectively. The processor 220 may also generate reference symbols, e.g., for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120a, the antennas 252a through 252r may receive the downlink signals from the BS 110a and may provide received signals to the demodulators (DEMODs) in transceivers 254a through 254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a through 254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein for per transmission configuration channel sensing. As shown in FIG. 2, the controller/processor 240 at the BS 110a includes a per transmission configuration channel sensing manager 241 and the controller processor 280 at the UE 120a includes the per transmission configuration channel sensing manager 281. The memories 242 and 282 may store data and program codes for BS 110a and UE 120a, respectively. A scheduler 244 may schedule UEs for data transmission on the downlink and/or uplink.

NR may utilize orthogonal frequency division multiplexing (OFDM) with a cyclic prefix (CP) on the uplink and downlink. NR may support half-duplex operation using time division duplexing (TDD). OFDM and SC-FDM partition the system bandwidth into multiple orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers may be dependent on the system bandwidth. NR may support a base subcarrier spacing (SCS) of 15 KHz and other subcarrier spacing may be defined with respect to the base subcarrier spacing, for example, 30 kHz, 60 kHz, 120 kHz, 240 kHz, etc. The minimum resource allocation, referred to as a resource block (RB), may be 12 consecutive frequency subcarriers. The system bandwidth may also be partitioned into subbands. For example, a subband may cover a number of RBs.

Figure 3:
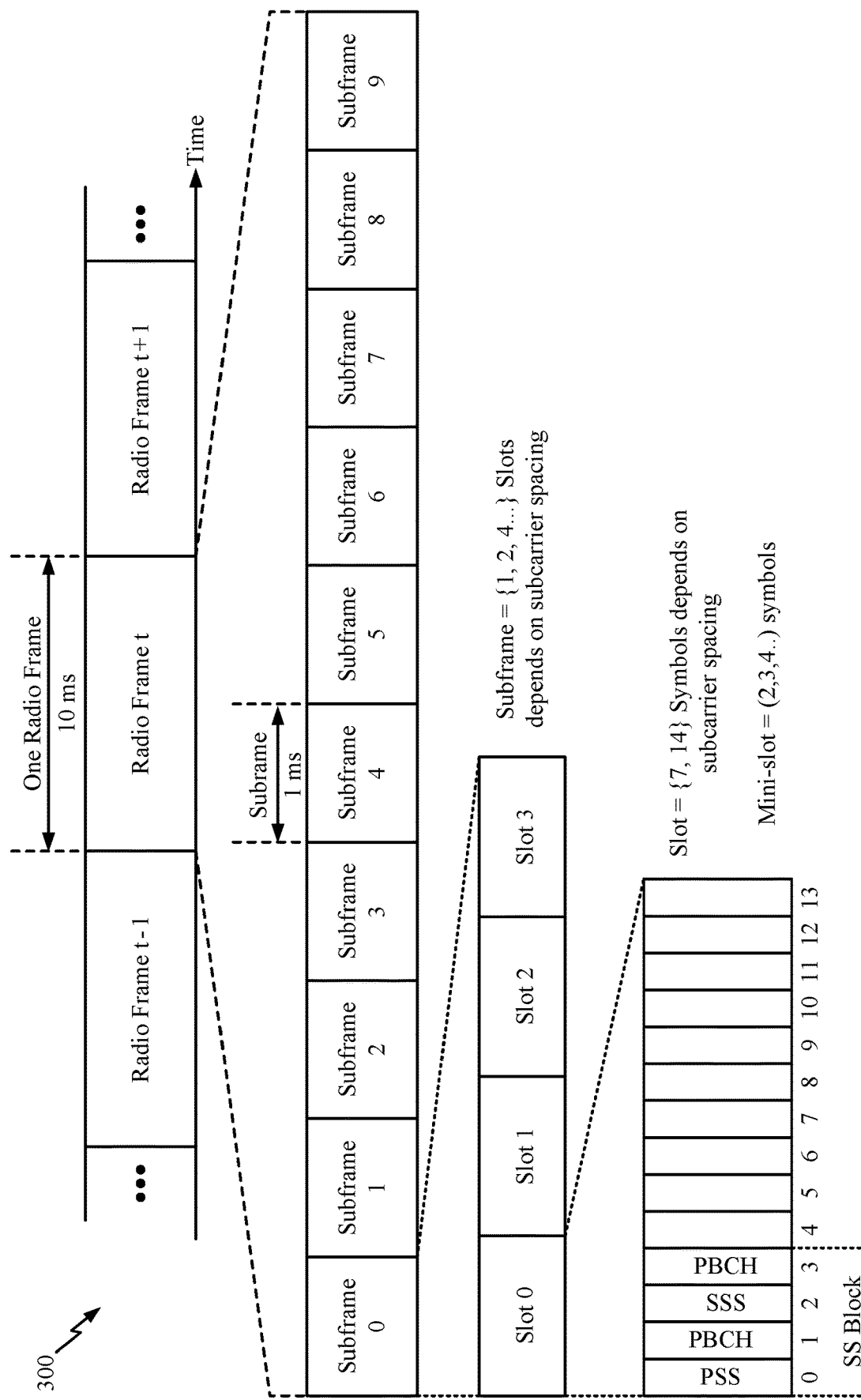
FIG. 3 illustrates an example of a frame format for a new radio (NR) system, in accordance with certain aspects of the present disclosure.

FIG. 3 is a diagram showing an example of a frame format 300 for NR. The transmission timeline for each of the downlink and uplink may be partitioned into units of radio frames. In NR, a subframe is 1 ms, but the basic TTI is referred to as a slot. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

As mentioned above, aspects of the present disclosure relate to per transmission configuration channel sensing.

In some systems, UEs perform performs channel sensing. Channel sensing may allow the UE to provide feedback to the BS regarding the channel, so that the BS can select the channel to use for communications with the UE. The channel sensing may be for multiple different transmission configurations, for example, to identify links that may be degraded (e.g., blocked or faded). As used herein, a transmission configuration may be associated with, but no limited to, transmission configuration indicator (TCI) states, transmission reception points (TRPs), antenna panels, beams, channels, links, control resource sets (coresets), and/or quasi co-location (QCL) groups.

In some examples, the UE is configured for discontinuous reception (DRX). The UE may sleep during an OFF period of a DRX cycle, which may be a long duration. Thus, when the UE exits DRS OFF period and enters the DRX ON duration, the UE may wake up and need quick channel sensing. For example, during the OFF duration, the UE is sleeping the UE may move or rotate and, therefore, some of the links may be degraded. So, when the UE wakes up, the UE may determine which transmission configurations are still valid. In certain systems, such as millimeter wave (mmW) systems (e.g., frequency range 2 in new radio (NR) systems) and/or for multiple transmission reception (multi-TRP) communications, multiple transmissions configurations are employed, for example using different beams. Thus, channel sensing may need to be performed for multiple transmission configurations.

In some systems, channel state information reference signals (CSI-RS) are used for channel sensing. However, channel sensing using CSI-RS may be slow and have a high cost. For example, CSI reporting timing is slow and the resources spent to transmit CSI-RS can be substantial.

Therefore, techniques for efficient channel sensing of multiple transmission configurations are desirable, including what type of signal to use for the channel sensing, how the signal is transmitted, and how the UE provides feedback for the channel sensing.

Example Per Transmission Configuration Channel Sensing

Aspects of the present disclosure provide techniques for per transmission configuration channel sensing.

According to certain aspects, dummy physical downlink shared channel (PDCCH) transmissions are sent to a user equipment (UE). The dummy PDCCH can be transmitted with different transmission configurations (e.g., per transmission configuration). In some examples, the dummy PDCCH refers to PDCCH that trigger feedback but do not carry a grant. A dynamic hybrid automatic repeat request (HARD) codebook may be used. The dummy PDCCH may include a dynamic assignment index (DAI) counter value and a DAI total value. The UE can provide acknowledgement (ACK) feedback, including ACKs and/or negative ACK (HACK) feedback, for the dummy PDCCH. In some cases, normal PDCCH, scheduling a physical downlink shared channel (PDSCH) transmission, may be transmitted in addition to the dummy PDCCH. In this case, the UE can multiplex ACK feedback for the PDSCH transmissions with the feedback for the dummy PDCCHs.

According to certain aspects, one or more bits in the UE HARQ codebook are reserved for the feedback. For example, each bit is reserved for feedback for one or more control resource sets (corsets) associated with a transmission configuration.

According to certain aspects, the base station (BS) transmits dummy PDCCH per transmission configuration for channel sensing. A dummy PDCCH refers to a PDCCH transmission without a downlink grant, but triggers ACK/NACK feedback. For example, the dummy PDCCH does not schedule a PDSCH transmission but points to feedback opportunity. The dynamic HARQ codebook may be configured for the dummy PDCCH. In some examples, one or more the downlink control information (DCI) fields may be reserved to indicate that the PDCCH is a dummy PDCCH. The dummy PDCCH may include DCI fields related to ACK/NACK but may not include certain fields used for scheduling a downlink grant. In some examples, the unused fields may be used for indicating the dummy PDCCH.

Figure 4:
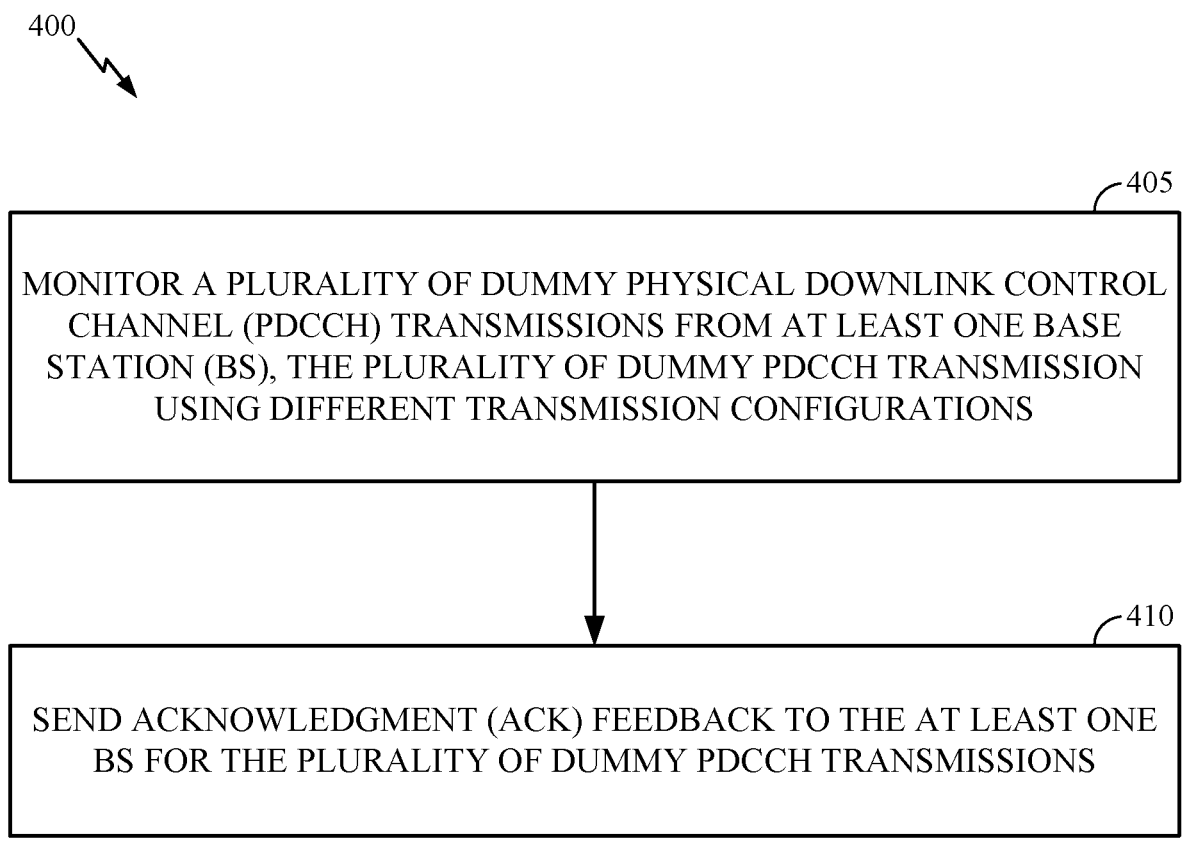
FIG. 4 is a flow diagram illustrating example operations for wireless communication by a UE, in accordance with certain aspects of the present disclosure.

FIG. 4 is a flow diagram illustrating example operations 400 for wireless communication, in accordance with certain aspects of the present disclosure. The operations 400 may be performed, for example, by a UE (e.g., such as a UE 120 in the wireless communication network 100). Operations by a UE may be implemented as software components that are executed and run on one or more processors (e.g., controller/processor 280 of FIG. 2). Further, the transmission and reception of signals by the UE may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 400 may begin, at 405, by monitoring a plurality of dummy PDCCH transmissions from at least one BS. The plurality of dummy PDCCH transmission use different transmission configurations. In some examples, the dummy PDCCH transmissions do not carry any downlink grants. The dummy PDCCHs may be transmitted/received in a same time instance (e.g., a same slot) or at different times. In some examples, the UE is configured for DRX. The dummy PDCCHs may be monitored during the DRX ON duration. For example, the UE may wake up and begin channel sensing. In some examples, the BS and the UE are configured for mmW communications (e.g., in NR FR2)

At 410, the UE sends ACK feedback to the at least one BS for the plurality of dummy PDCCH transmission. For example, the UE sends ACKs for successfully detected dummy PDCCH transmissions and the UE sends NACKs for unsuccessful detection of dummy PDCCH transmissions.

In some examples, a dynamic HARQ-ACK codebook is configured. In this case, each PDCCH carries a dynamic downlink assignment index (DAI) counter value and a DAI total value. According to certain aspects, each of the plurality of dummy PDCCH transmissions includes a DAI counter value that increments with each dummy PDCCH transmission. Each of the plurality of dummy PDCCH transmissions includes a DAI total value (e.g., the same DAI total for PDCCH transmitted in a same time instance or a different DAI total for PDCCH transmitted at different times). In some examples, the UE sends an ACK at the corresponding DAI location in the UE HARQ codebook when the PDCCH transmission including the DAI counter value is received and the UE sends a NACK at the corresponding DAI location in the UE HARQ codebook when a PDCCH transmission including the DAI counter value is not received. In some examples, the UE sends a NACK when it detects a hole in the DAI counter (e.g., when it receives a PDCCH with DAI counter value but did not receive the PDCCH with the previous DAI counter value).

Figure 5:
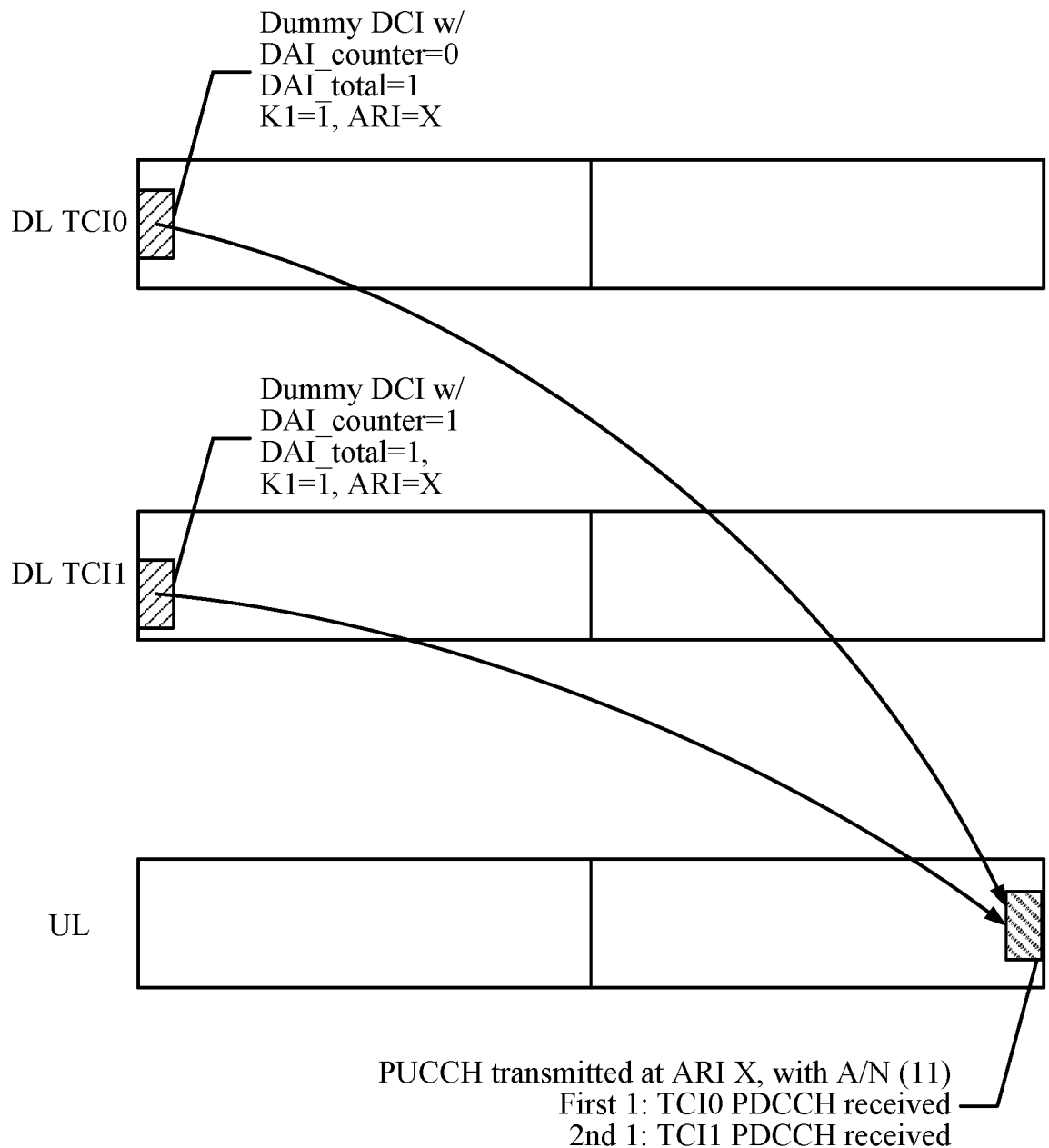
FIGS. 5-8 are examples of per transmission configuration channel sensing, in accordance with certain aspects of the present disclosure.

As shown in FIG. 5, the BS sends downlink control information (DCI) on dummy PDCCH with different transmission configurations (e.g., TCI 0 and TCI 1 in the example in FIG. 5). The dummy DCI indicate the same DAI total. All of the dummy DCI point to the same feedback opportunity (e.g., same slot, same ACK resource indicator (ARI) value, same K1 value, etc.). The UE will feedback ACK, when at least one DCI is received. In the example shown in FIG. 5, the UE successfully detects both the dummy DCI with TCI0 and the TCI1 and so the UE sends ACK feedback (11) for the TCI0 and TCI1, respectively In the example shown in FIG. 6, the UE does not detect the dummy DCI for the TCI0 (e.g., the link is broken), but the UE does detect the dummy DCI for the TCI1. Thus, the UE detects the hole in the DAI counter (e.g., received DCI with the DAI counter value 1, but did not receive DCI with the DAI counter value 0). Thus, the UE sends the feedback (01), a NACK for the TCI0 and an ACK for the TCI1, as shown in FIG. 6.

Figure 6:
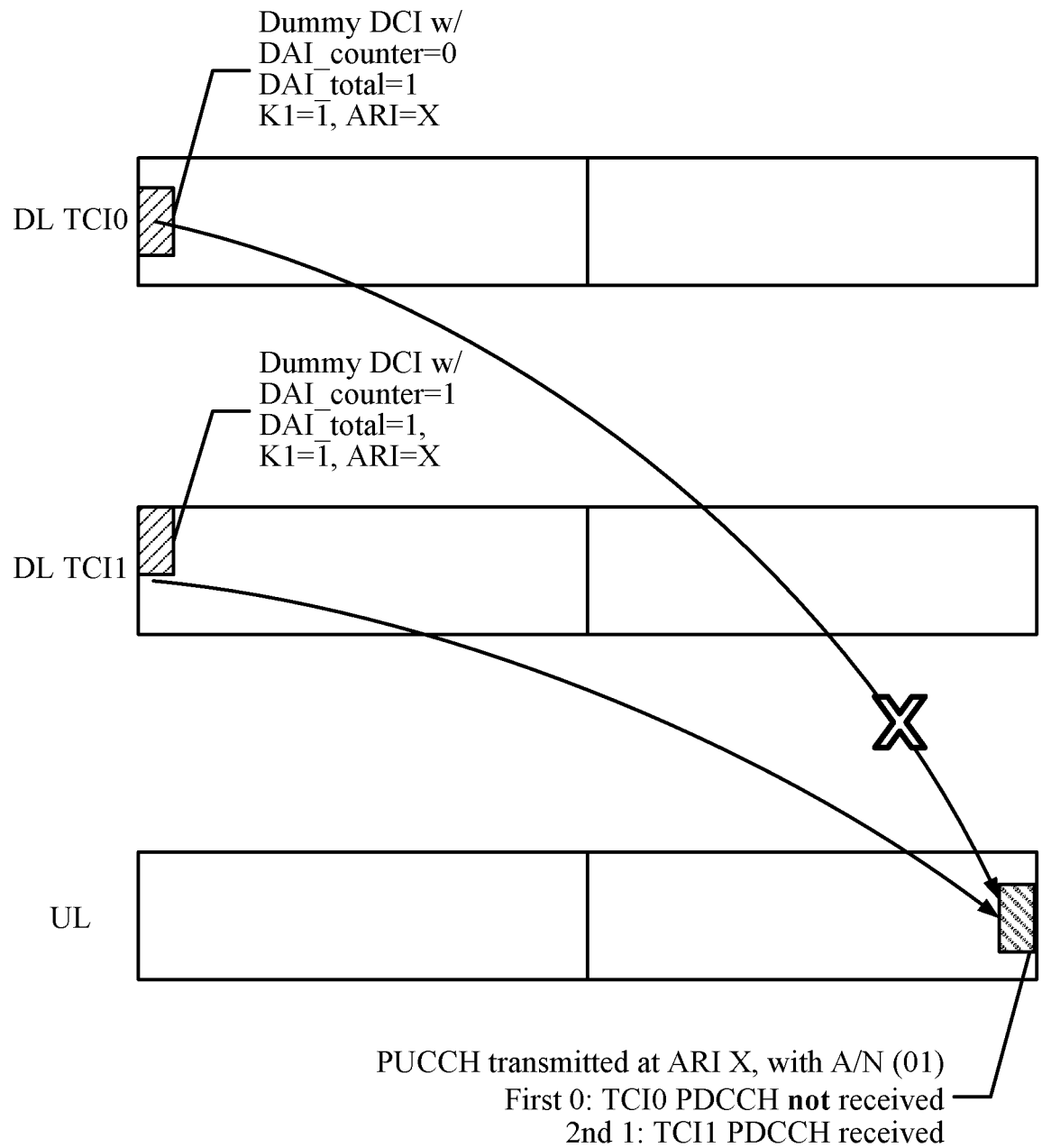

In the examples shown in FIG. 5 and FIG. 6, the BS does not send any normal DCI scheduling data. For example, this may be the case for channel sensing upon a DRX wake up for mmW systems (e.g., such NR FR2) or multi-TRP. After the channel sensing, the BS can use an acknowledged transmission configuration to schedule PDSCH. In some example, the BS may schedule PDSCH after DRX wake up. In some examples, the BS is already serving the UE with a transmission configuration, and the BS wants to test the other link as well. For example, the BS may send dummy PDCCH with just the other transmission configurations that the BS wants to test.

Figure 7:
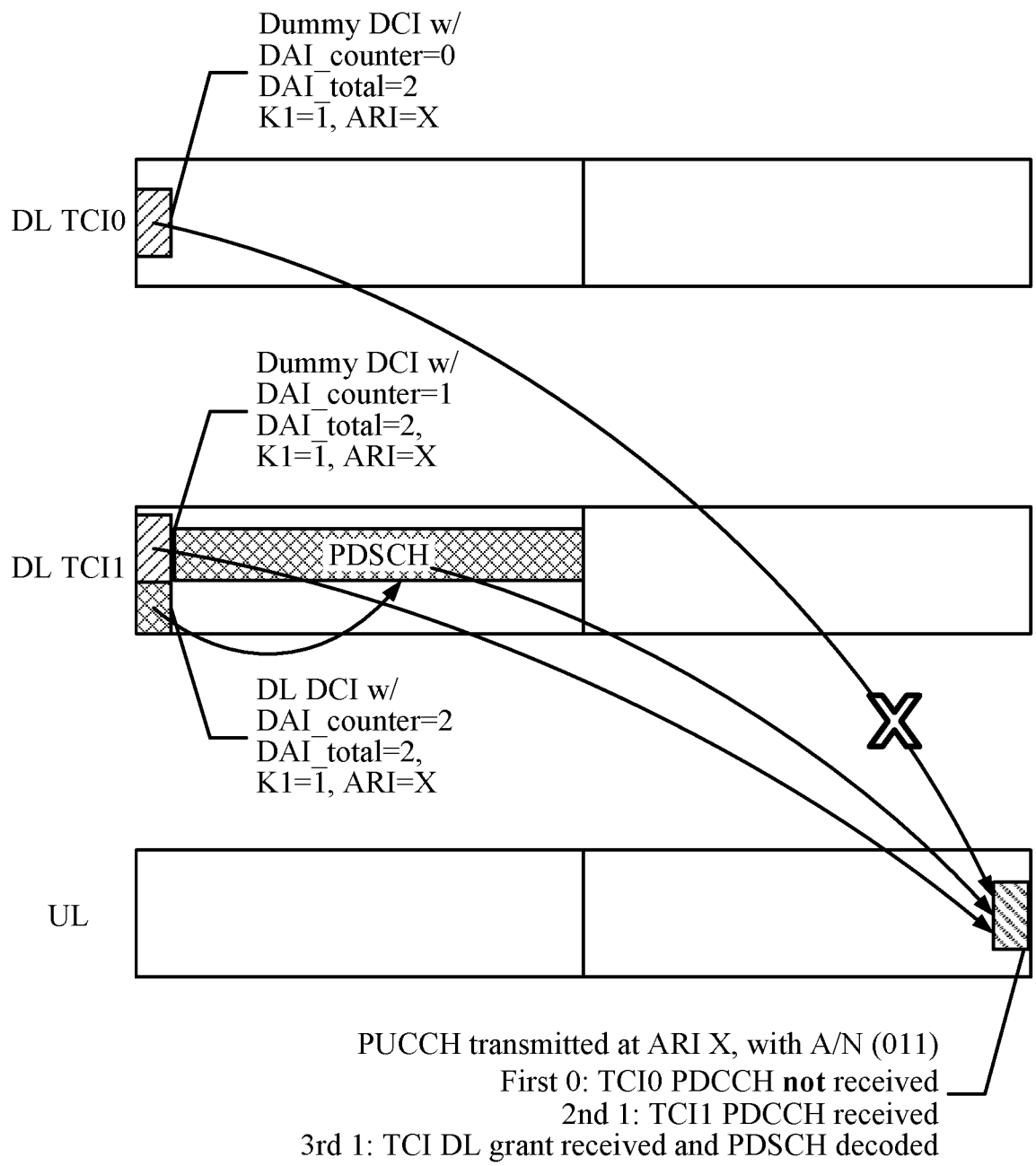
Figure 8:
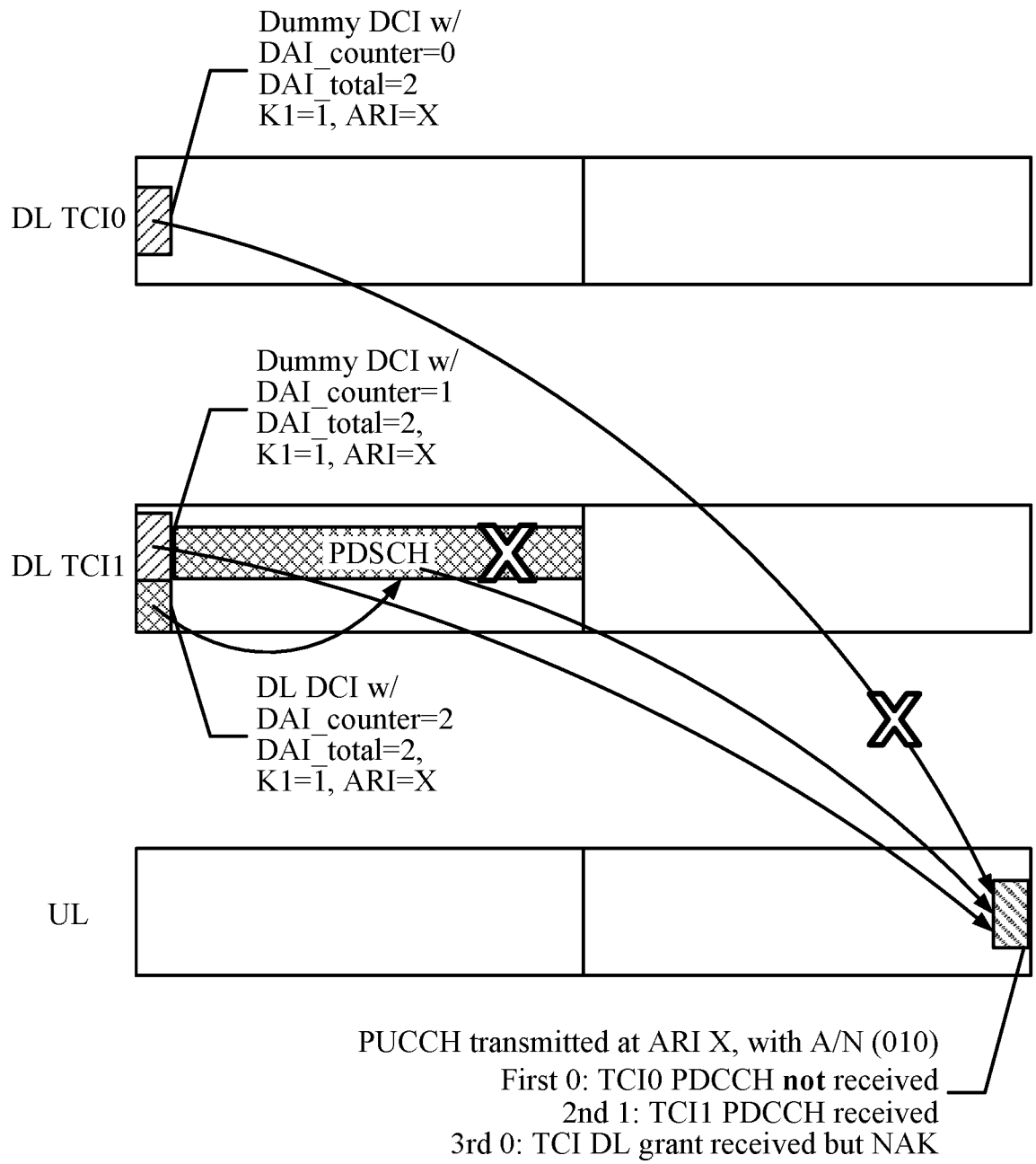

When PDSCH is scheduled, the ACK feedback for the dummy PDCCH transmissions can be multiplexed with the ACK feedback for the scheduled PDSCH transmissions as shown in FIG. 7 and FIG. 8. In the example shown in FIG. 7, the BS can send a normal grant using the TCI1 in addition to the dummy DCIs using the TCI0 and TCI1. As shown, the DCI scheduling the PDSCH may have the same DAI counter value as the dummy DCI using the same transmission configuration. In the example shown in FIG. 7, the dummy DCI using TCI0 is not successfully detected, the dummy DCI using TCI1 is successfully detected, and the normal DCI and the PDSCH are successfully decoded. Thus, the UE sends the multiplexed ACK feedback (011). In the example shown in FIG. 8, the dummy DCI with TCI0 is not successfully received, the dummy DCI using TCI1 is successfully detected, the normal DCI is successfully detected, and the PDSCH is not successfully decoded. Thus the UE sends the multiplexed ACK feedback (010).

In some examples, code block group (CBG) is configured. In this case, the UE may provide separate ACK feedback for each CBG of the dummy PDCCHs. For example, the ACK feedback can include multiple bits for each dummy PDCCH transmission, each of the multiple bits corresponding to a CBG of the dummy PDCCH transmission.

Figure 9:
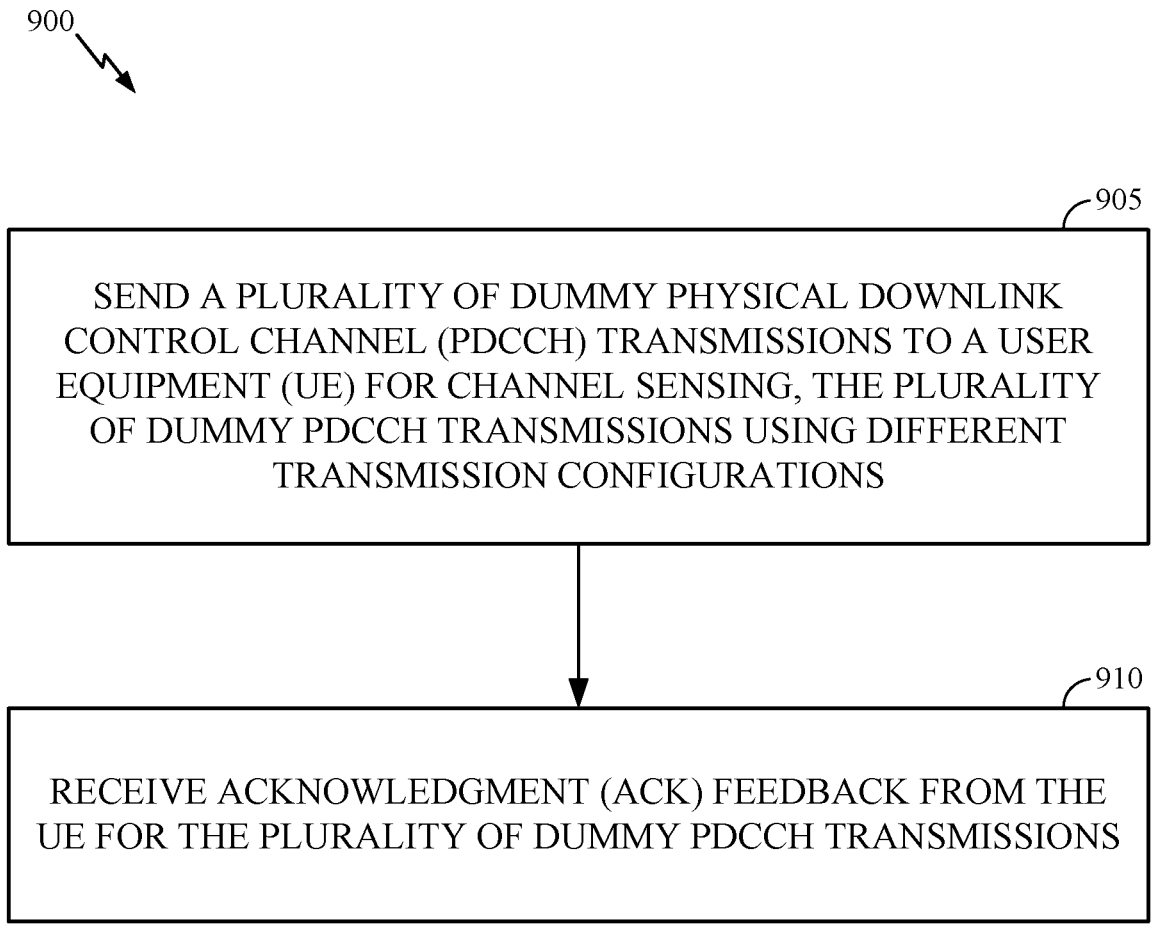
FIG. 9 is a flow diagram illustrating example operations for wireless communication by a BS, in accordance with certain aspects of the present disclosure.

FIG. 9 is a flow diagram illustrating example operations 900 for wireless communication, in accordance with certain aspects of the present disclosure. The operations 900 may be performed, for example, by a BS (e.g., such as a BS 110a in the wireless communication network 100). The operations 900 may be complimentary operations by the BS to the operations 400 performed by the UE.

Operations by the BS may be implemented as software components that are executed and run on one or more processors (e.g., controller/processor 240 of FIG. 2). Further, the transmission and reception of signals by the BS may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 900 may begin, at 905, by transmitting a plurality of dummy PDCCH transmissions to a UE for channel sensing. The dummy PDCCH trigger feedback but do not carry any downlink grants. The BS transmits the plurality of dummy PDCCH transmissions using different transmission configurations.

At 910, the BS receives ACK feedback from the UE for the plurality of dummy PDCCH transmissions. For example, the ACK feedback includes ACKs indicating successfully detected dummy PDCCH transmissions and NACKs indicating unsuccessfully detected dummy PDCCH transmissions. In some examples, the ACK feedback for the dummy PDCCH transmissions is multiplexed with ACK feedback from the UE for one or more PDSCH transmissions (e.g., transmitted by the BS).

According to certain aspects, the BS selects at least one of the different transmission configurations to use for communications with the UE based on the ACK feedback. For example, if the BS receives a NACK, the BS knows the PDCCH was not receive and may determine that the link is broken. Thus, the BS selects a different link for communicating (e.g., a link for which an ACK is received).

Example Transmission Configuration-Specific Reserved ACK/NACK Bits

According to certain aspects, there may be transmission configuration-specific reserved bits in the UE codebook. For example, for each ACK/NACK transmission occasion, a bit can be reserved for one or more control resource sets (coresets) out of a set of coresets associated with a transmission configuration. In this case, the UE may transmit an ACK using one of the reserved bits when a PDCCH transmission is received in the corresponding coreset and a NACK using the reserved bits when ae PDCCH transmission is not received in the corresponding coreset According to certain aspects, the reserved bits may be for a dynamic HARQ-ACK codebook or a semi-static HARQ-ACK codebook. Dummy PDCCH and/or normal PDCCH may be used for the channel sensing with the reserved bits.

In some examples, the reserved bit may indicate multiple CBGs for the coreset for a transmission configuration.

Figure 10:
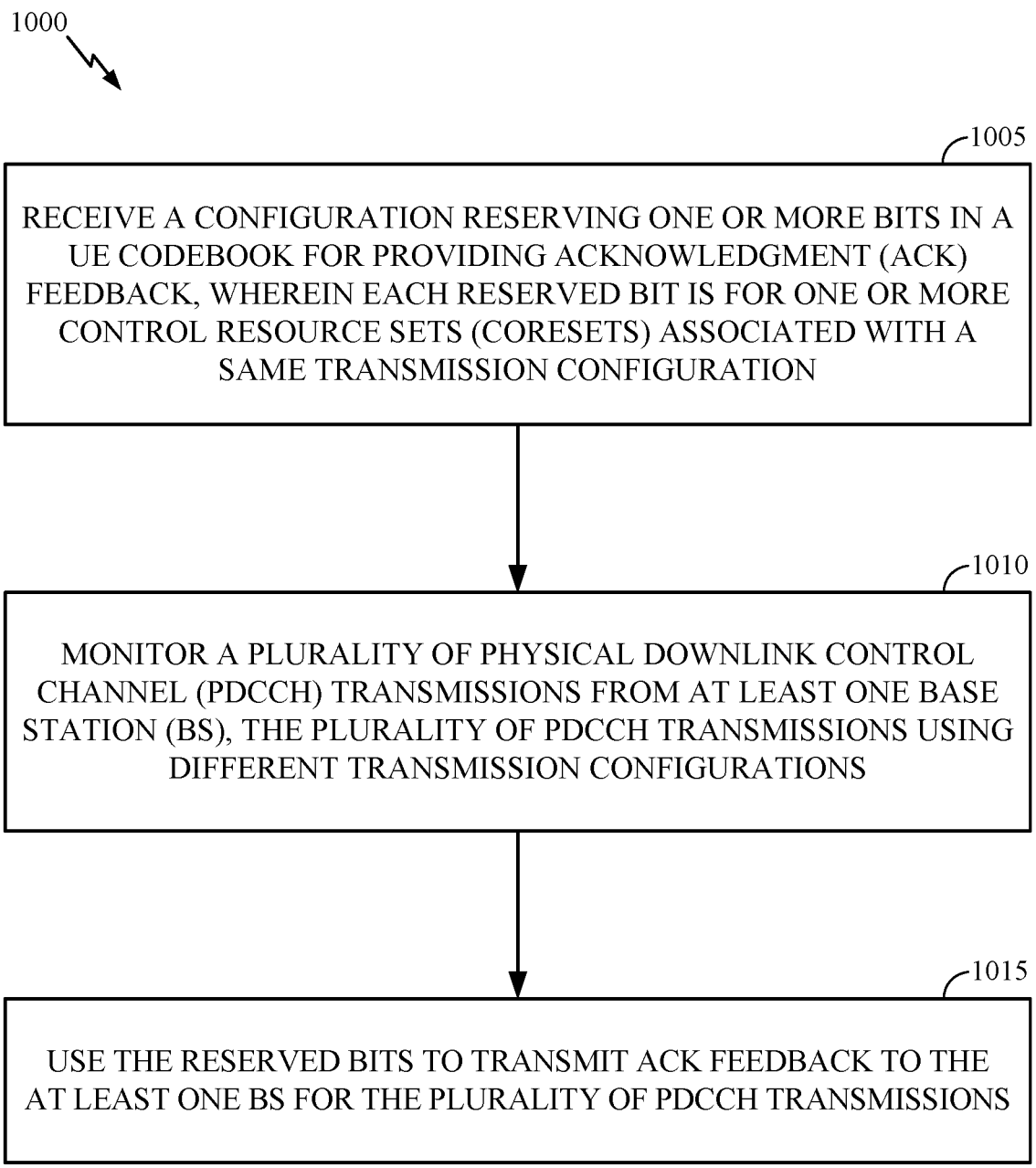
FIG. 10 is a flow diagram illustrating example operations for wireless communication by a UE, in accordance with certain aspects of the present disclosure.

FIG. 10 is a flow diagram illustrating example operations 1000 for wireless communication, in accordance with certain aspects of the present disclosure. The operations 1000 may be performed, for example, by a UE (e.g., such as the UE 120a in the wireless communication network 100).

The operations 1000 may begin, at 1005, by receiving a configuration reserving one or more bits in a UE codebook for providing ACK feedback. Each reserved bit is for one or more coresets associated with a same transmission configuration. The PDCCH may be a dummy PDCCH, a normal PDCCH, and/or a common PDCCH the UE is configured to monitor. One bit can be reserved for multiple coresets that have the same transmission configuration. Different bits are reserved for coresets having different transmission configurations. Some coreset may not have a reserved bit (e.g., coreset 0). In some examples, a fixed additional number of bits per A/N feedback occasion are configured.

At 1010, the UE monitors a plurality of PDCCH transmissions from at least one BS. The plurality of PDCCH transmissions use different transmission configurations.

At 1015, the UE uses the reserved bits to transmit ACK feedback to the at least one BS for the plurality of PDCCH transmissions. For example, the UE transmits an ACK when a PDCCH transmission is received in the corresponding coreset and a NACK when a PDCCH transmission is not received in the corresponding coreset.

Figure 11:
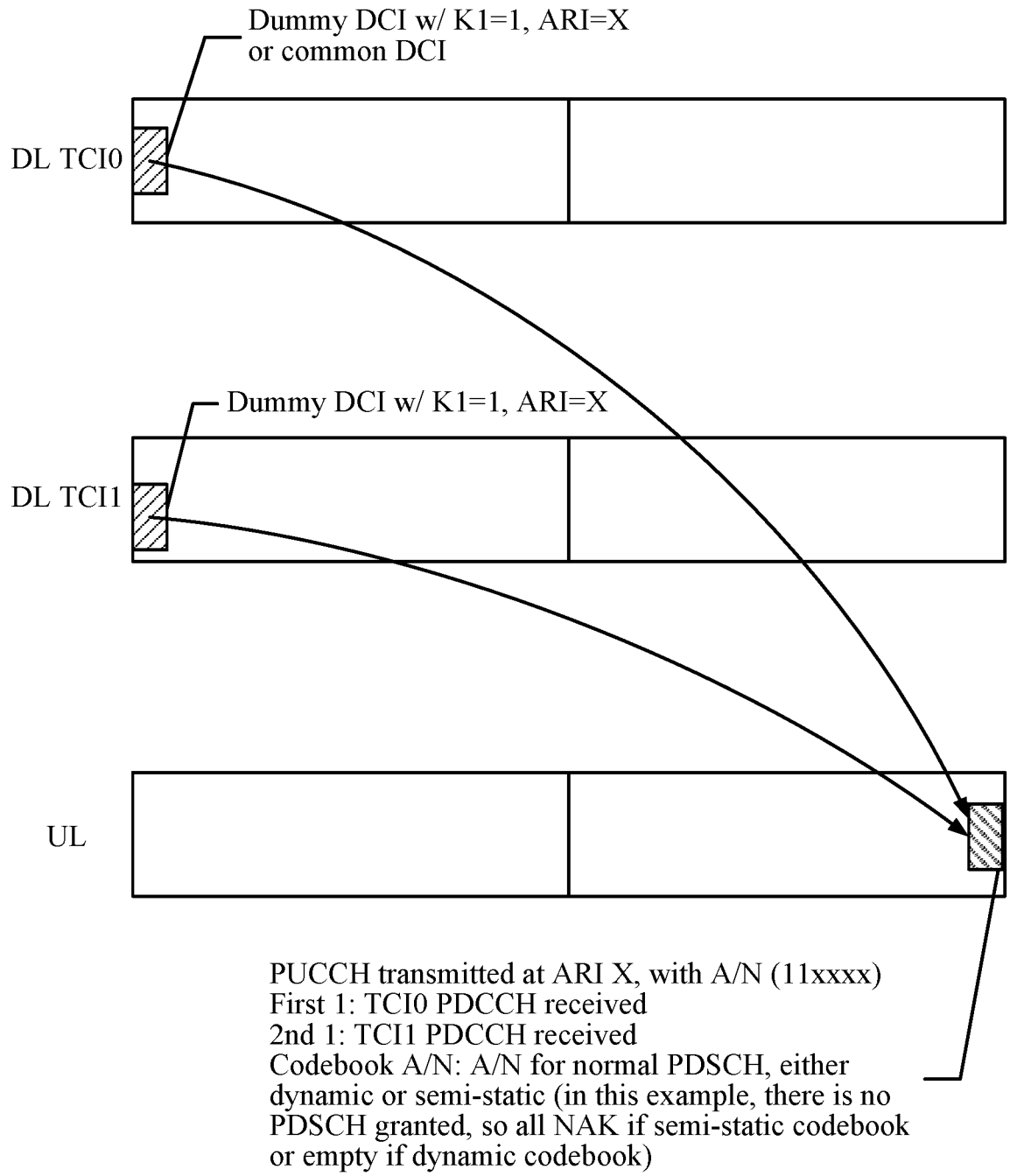
FIGS. 11-14 are examples of per transmission configuration channel sensing, in accordance with certain aspects of the present disclosure.
Figure 12:
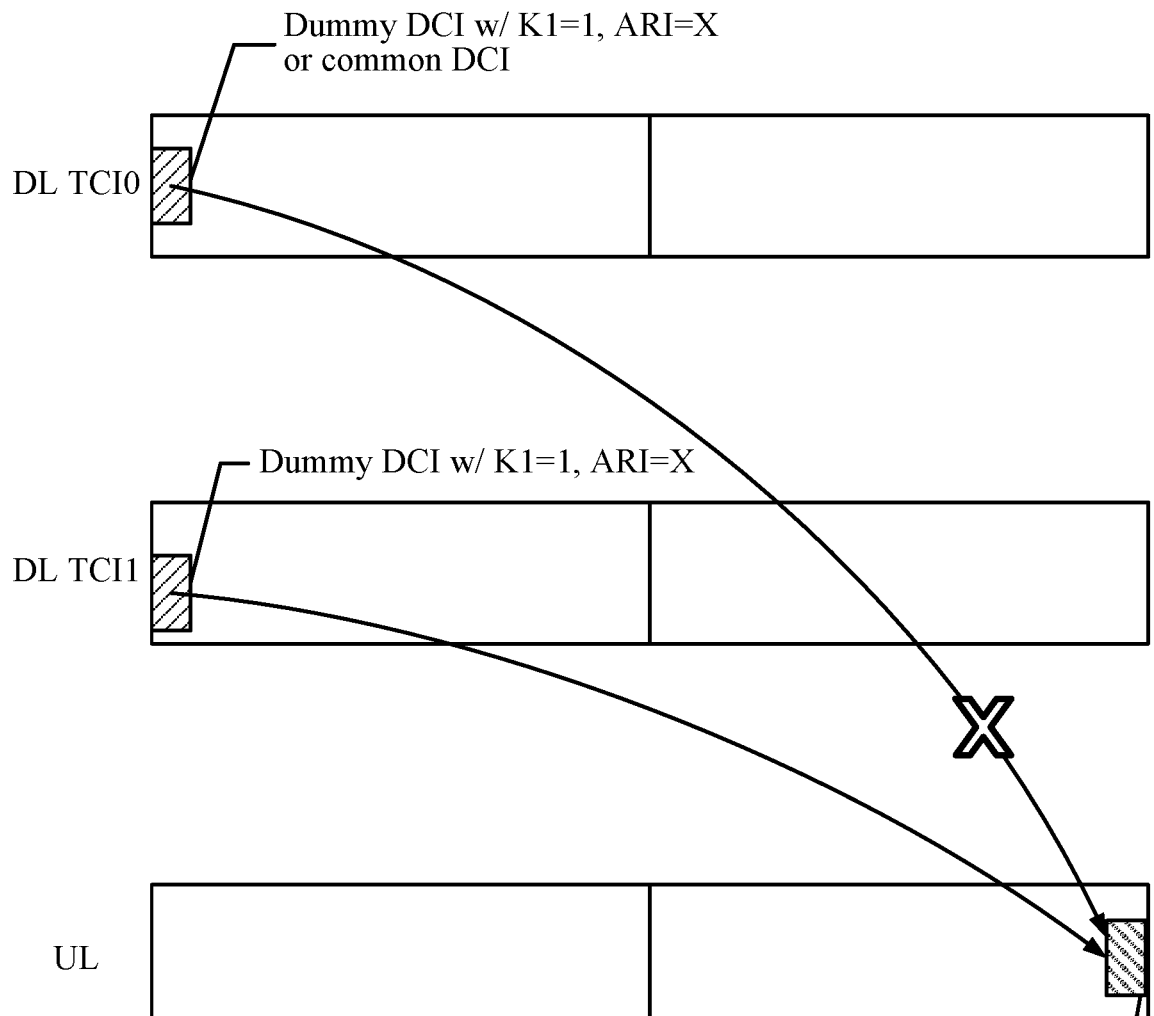

The BS may send dummy DCI or common DCI from different (e.g., each) transmission configuration (e.g., TCI state, TRP, coreset, etc.). These DCI point to a feedback opportunity (e.g., the same feedback opportunity) to trigger feedback. The UE may perform DCI blind detections. When at least one DCI is received, an ACK is transmitted at the location (e.g., the reserved bit) in the codebook corresponding to the transmission configuration. For example, as shown in the example in FIG. 11, the DCI using TCI0 and the TCI1 are both successfully received. Thus, the UE sends the ACK feedback (11xxxx) where the first bit is reserved for the TCI0, the second bit is reserved for the TCI1, and the remaining reserved bits are NACK if the semi-static codebook is used or empty if the dynamic codebook is used. The UE sends a NACK if no DCI is detected from that transmission configuration. In the example shown in FIG. 12, the DCI using TCI0 is not detected, and the DCI using TCI1 is successfully detected. Thus, the UE sends the ACK feedback (01xxxx). Based on the ACK feedback, the BS can use (e.g., select) a good (e.g., an ACK'd) transmission configuration to schedule PDSCH.

In some examples, channel sensing with transmission configuration-specific reserved bits for the feedback is for DRX wake up for mmW systems (e.g., such NR FR2) or multi-TRP. In some examples, the BS is already serving the UE with a transmission configuration, and the BS wants to test another other link. The BS may send dummy PDCCH, normal PDCCH, or common PDCCH the UE is configured to monitor, with just the other transmission configuration(s) that the BS wants to test.

Figure 13:
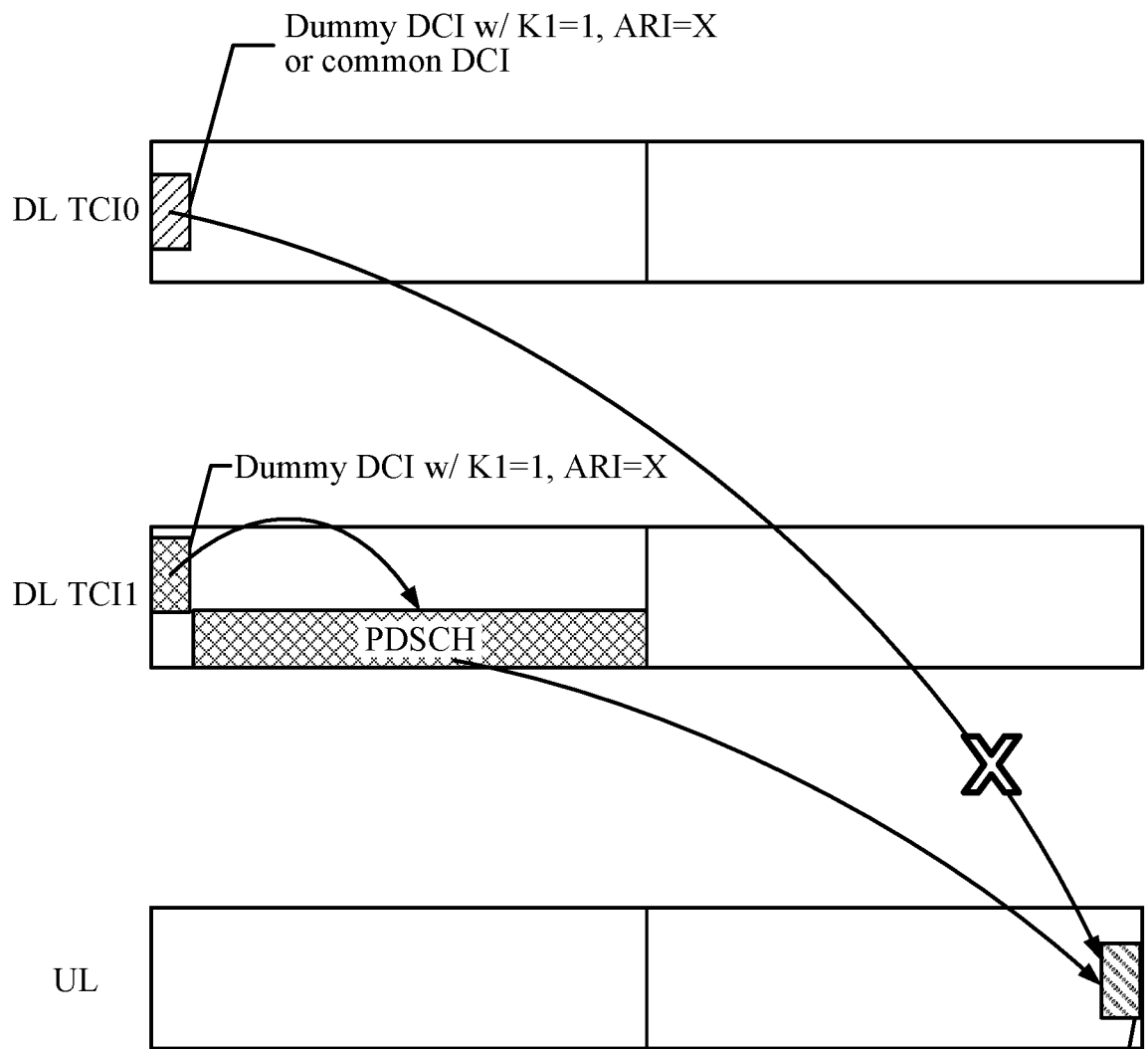
Figure 14:
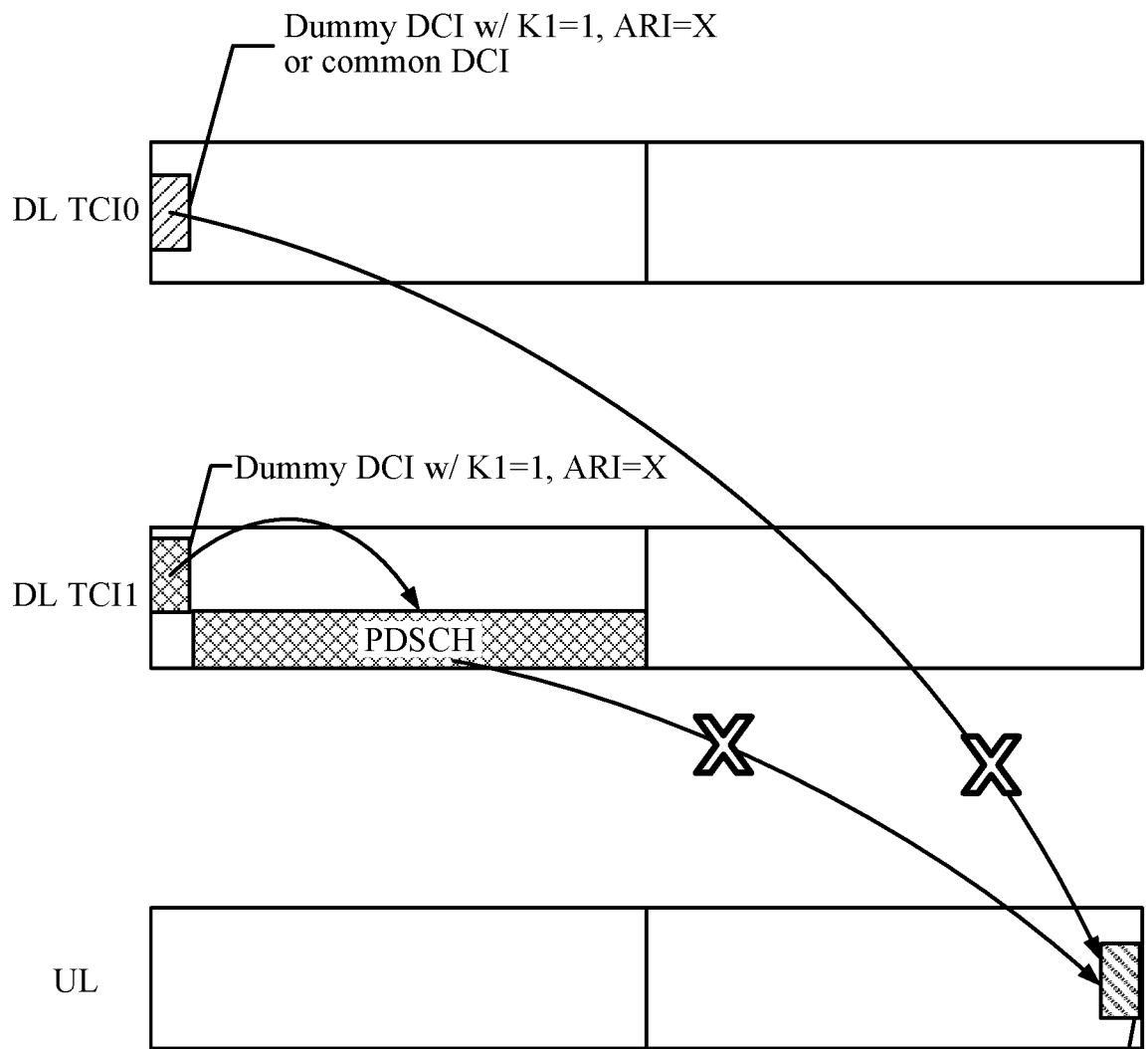

In some examples, the BS can send a grant to schedule data, in addition to the PDCCH for the channel sensing. In this case, the feedback from the UE for the normal grant may be multiplexed with the feedback for the channel sensing PDCCH. In the example shown in FIG. 13, the UE does not receive dummy DCI using TCI0, successfully detects a normal DCI using TCI1 and successfully decodes the PDSCH. Thus, the UE sends the ACK feedback (01xxxx) using the reserved bits. The UE also sends an ACK for the PDSCH. As shown, in some examples, when a normal grant is sent, the normal PDCCH can be used for the channel sensing for that transmission configuration (e.g., a dummy PDCCH does not need to be sent for that transmission configuration). In the example shown in FIG. 14, the UE does not detect the DCI using the TCI0, successfully detects the DCI using the TCI1, and does not successfully decode the PDSCH. Thus, the UE sends the ACK feedback (01xxxx) using the reserved bits and also sends a NACK for the PDSCH.

According to certain aspects, the UE may transmit ACK feedback for only a subset of received PDCCH transmissions. The ACK feedback may be for a subset of dummy PDCCH or normal PDCCH. The subset of ACK feedback may be for the dynamic HARQ codebook and/or for the reserved bit. For example, the subset may be based at least in part on a measured signal quality associated with the PDCCH transmissions. In some examples, the UE may send ACK only for "better" PDCCH. For example, the UE may send ACK for PDCCH with a higher signal-to-noise ratio (SNR) and not send ACK for PDCCH received with a lower SNR. The threshold difference may be configured, for example, by the BS. In some examples, the threshold may be an absolute threshold. For example, the UE may send ACK for PDCCH with SNR at or above the threshold SNR and the UE may not send ACK for PDCCH with SNR below the SNR threshold. The absolute threshold may be configured, for example, by the BS. The UE may measure a demodulation reference signal (DMRS) to determine the SNR for associated downlink control information (DCI). In some examples, the UE may be configured, for example by the BS, to send ACK for a configured number of the PDCCHs (e.g., K PDCCH out of N total PDCCH).

According to certain aspects, the BS can transmit multiple PDCCH to the UE for channel sensing for a single transmission configuration. The UE receives multiple PDCCH transmissions from the BS using at least one same transmission configuration. The multiple PDCCH transmissions for transmission configuration may point the same ACK/NACK occasion (e.g., schedule ACK/NACK feedback for the same or different time instances). In this case, the UE may use on bit to provide feedback for PDCCHs for the same transmission configuration. If the multiple PDCCHs point to different ACK/NACK occasions, then the UE may use one bit for each of the PDCCHs, to provide feedback separately for each of the PDCCHs for the transmission configuration.

Figure 15:
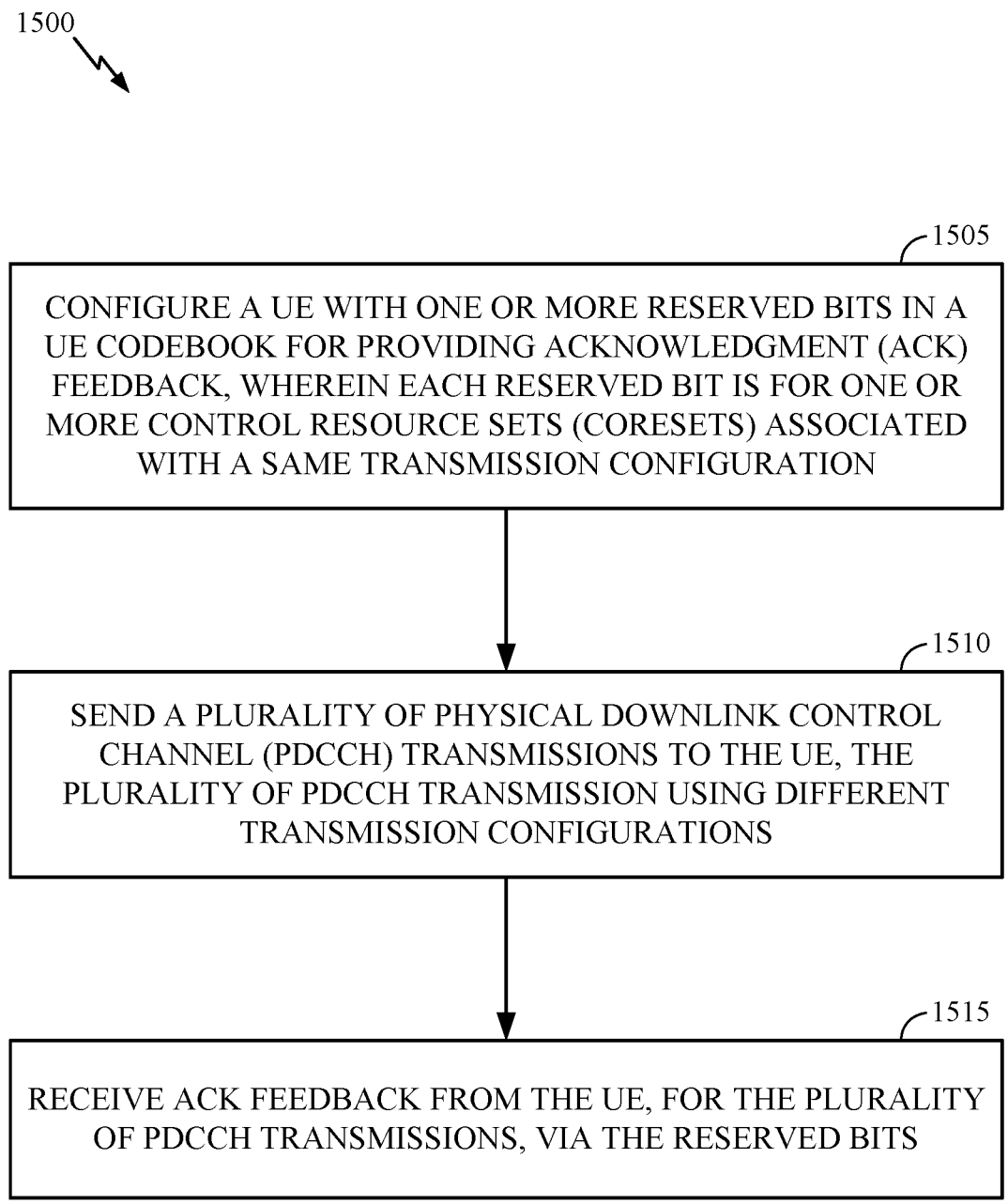
FIG. 15 is a flow diagram illustrating example operations for wireless communication by a BS, in accordance with certain aspects of the present disclosure.

FIG. 15 is a flow diagram illustrating example operations 1500 for wireless communication, in accordance with certain aspects of the present disclosure. The operations 1500 may be performed, for example, by a BS (e.g., such as the BS 110a in the wireless communication network 100). The operations 1500 may be complimentary operations by the BS to the operations 1000 performed by the UE.

The operations 1500 may begin, at 1505, by configuring a UE with one or more reserved bits in a UE codebook for providing ACK feedback. Each reserved bit is for one or more coresets associated with a same transmission configuration. At 1510, the BS sends a plurality of PDCCH transmissions to the UE. The plurality of PDCCH transmissions use different transmission configurations. At 1515, the BS receives an ACK feedback from the UE, for the plurality of PDCCH transmissions, via the reserved bits. For example, the BS receives an ACK indicating a PDCCH transmission is received in the corresponding coreset and a NACK indicating a PDCCH transmission is not received in the corresponding coreset.

Figure 16:
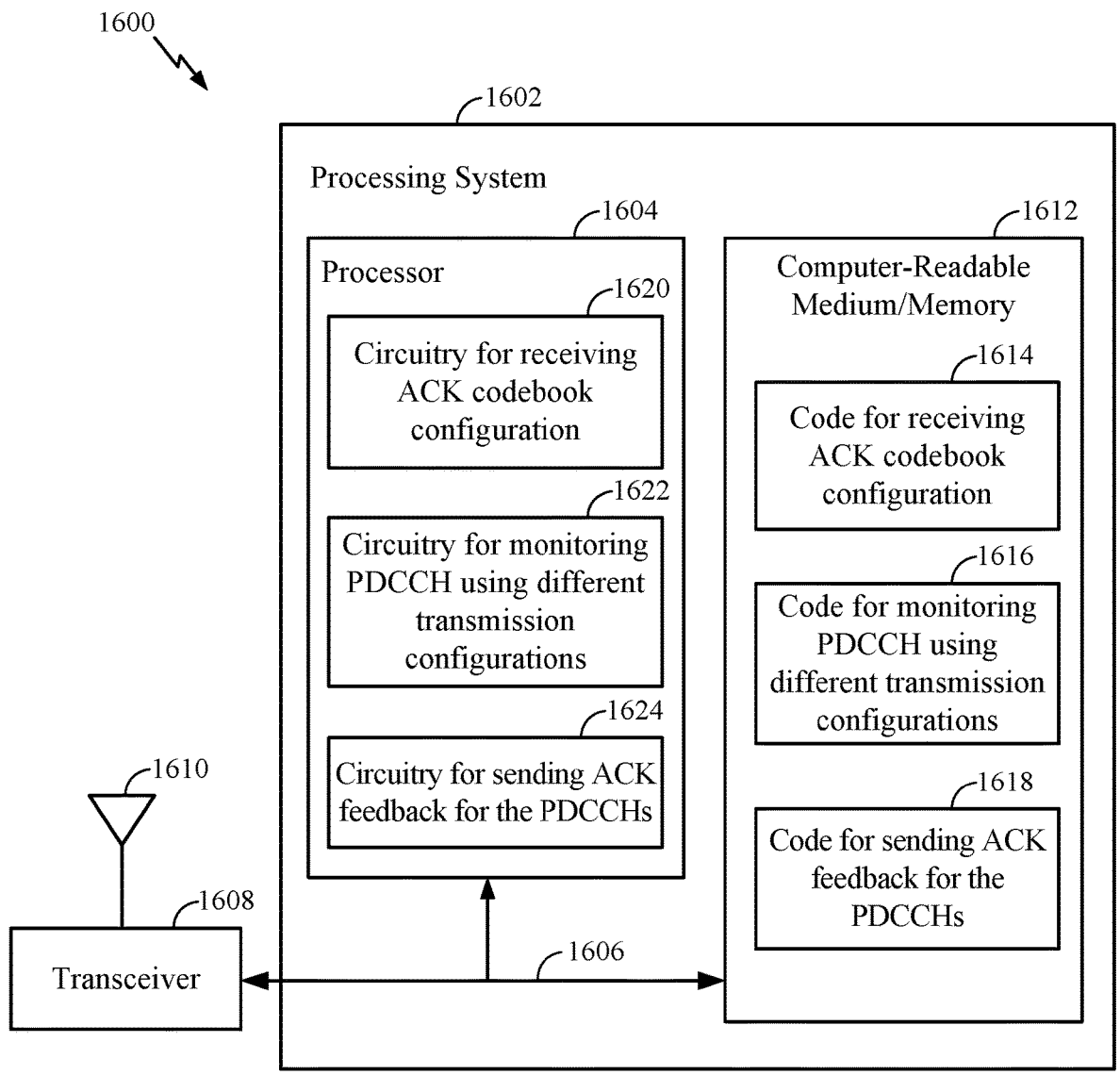
FIG. 16 illustrates a communications device that may include various components configured to perform operations for the techniques disclosed herein in accordance with aspects of the present disclosure.

FIG. 16 illustrates a communications device 1600 that may include various components (e.g., corresponding to means-plus-function components) configured to perform operations for the techniques disclosed herein, such as the operations illustrated in FIG. 4 and/or FIG. 9. The communications device 1600 includes a processing system 1602 coupled to a transceiver 1608. The transceiver 1608 is configured to transmit and receive signals for the communications device 1600 via an antenna 1610, such as the various signals as described herein. The processing system 1602 may be configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/memory 1612 is configured to store instructions (e.g., computer-executable code) that when executed by the processor 1604, cause the processor 1604 to perform the operations illustrated in FIG. 4 and/or FIG. 9, or other operations for performing the various techniques discussed herein for per transmission configuration channel sensing. In certain aspects, computer-readable medium/memory 1612 stores code 1614 for receiving a codebook configuration, such as a semi-static or dynamic HARQ-ACK codebook configuration, which may include transmission configuration-specific reserved bits; code 1616 for monitoring PDCCHs using different transmission configuration, which may be dummy, normal and/or common PDCCHs; and code 1618 for providing ACK feedback for the PDCCHs, which can include sending ACK for successfully received PDCCHs and/or NACKs for PDCCHs when a hole is detected in the DAI counter values or when no PDCCH is detected in a coreset, and may include providing the ACK/NACK feedback using reserved bits. In certain aspects, the processor 1604 has circuitry configured to implement the code stored in the computer-readable medium/memory 1612. The processor 1604 includes circuitry 1620 for receiving a codebook configuration; circuitry 1622 for monitoring PDCCHs using different transmission configurations; and circuitry 1624 for providing ACK feedback for the PDCCHs.

Figure 17:
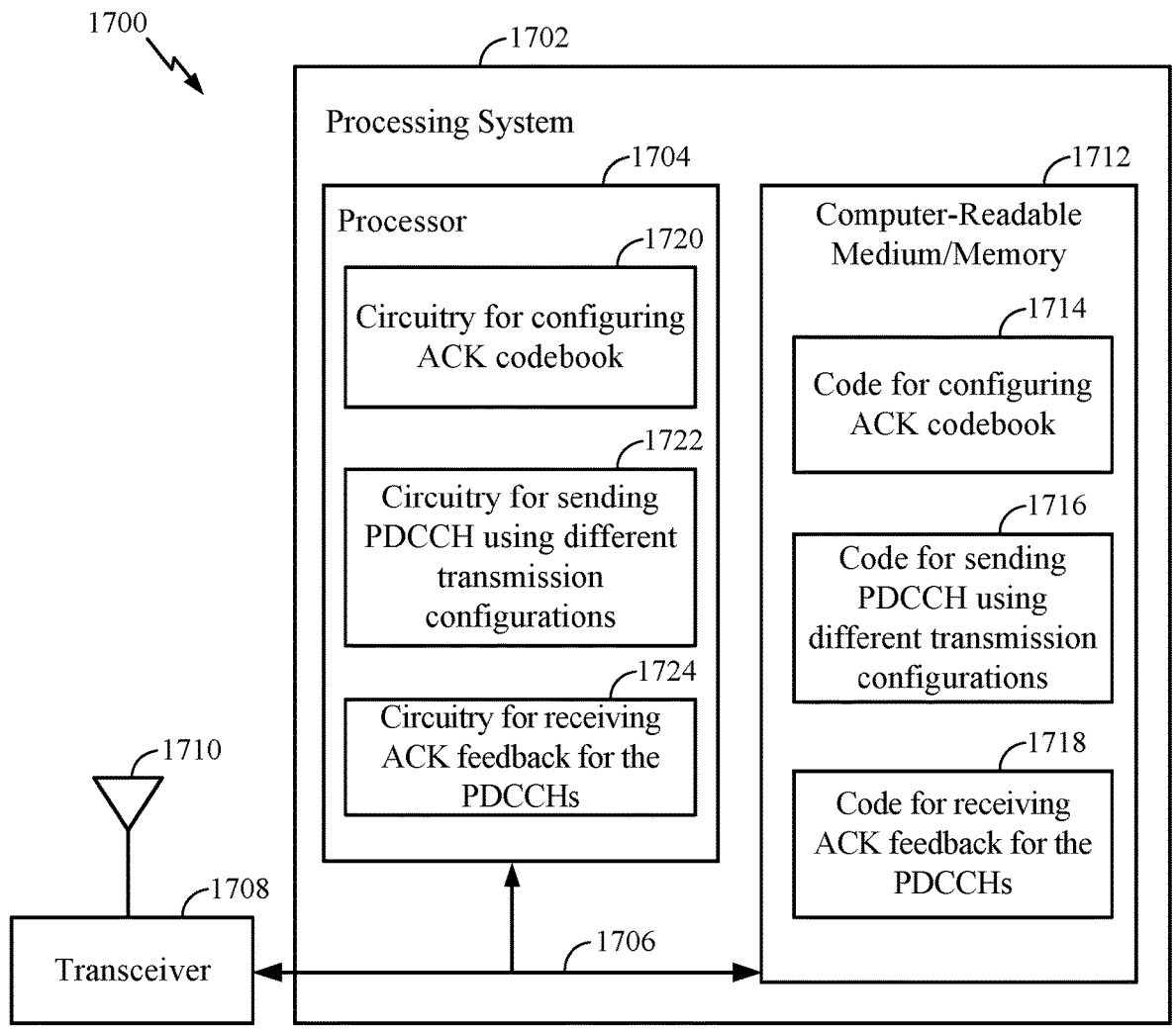
FIG. 17 illustrates a communications device that may include various components configured to perform operations for the techniques disclosed herein in accordance with aspects of the present disclosure.

FIG. 17 illustrates a communications device 1700 that may include various components (e.g., corresponding to means-plus-function components) configured to perform operations for the techniques disclosed herein, such as the operations illustrated in FIG. 10 and/or FIG. 15. The communications device 1700 includes a processing system 1702 coupled to a transceiver 1708. The transceiver 1708 is configured to transmit and receive signals for the communications device 1700 via an antenna 1710, such as the various signals as described herein. The processing system 1702 may be configured to perform processing functions for the communications device 1700, including processing signals received and/or to be transmitted by the communications device 1700.

The processing system 1702 includes a processor 1704 coupled to a computer-readable medium/memory 1712 via a bus 1706. In certain aspects, the computer-readable medium/memory 1712 is configured to store instructions (e.g., computer-executable code) that when executed by the processor 1704, cause the processor 1704 to perform the operations illustrated in FIG. 10 and/or FIG. 15, or other operations for performing the various techniques discussed herein for per transmission configuration channel sensing. In certain aspects, computer-readable medium/memory 1712 stores code 1714 for configuring an ACK codebook, such as a semi-static or dynamic HARQ-ACK codebook, which may include transmission configuration reserved bits; code 1716 for transmitting PDCCHs using different transmission configurations, which may be dummy, normal and/or common PDCCHs; and code 1718 for receiving ACK feedback for the PDCCHs. In certain aspects, the processor 1704 has circuitry configured to implement the code stored in the computer-readable medium/memory 1712. The processor 1704 includes circuitry 1720 for configuring an ACK codebook; circuitry 1722 for transmitting PDCCHs using different transmission configurations; and circuitry 1724 for receiving ACK feedback for the PDCCHs.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

In 3GPP, a BS or cell can refer to a coverage area of a Node B (NB) and/or a NB subsystem serving this coverage area, depending on the context in which the term is used. In NR systems, the term "cell" and next generation NodeB (gNB or gNodeB) or transmission reception point (TRP) may be interchangeable.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 4, 9, 10, and/or 15.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), comprising:
   monitoring a plurality of dummy physical downlink control channel (PDCCH) transmissions from at least one base station (BS), the plurality of dummy PDCCH transmissions using different transmission configurations and pointing to a same feedback opportunity; and
   sending acknowledgment (ACK) feedback in the feedback opportunity to the at least one BS for the plurality of dummy PDCCH transmissions.

2. The method of claim 1, wherein sending the ACK feedback comprises:
   sending ACKs to the at least one BS for successfully detected dummy PDCCH transmissions; and
   sending negative ACKs (NACKs) to the at least one BS for unsuccessful detection of dummy PDCCH transmissions.

3. The method of claim 1, wherein the ACK feedback for the plurality of dummy PDCCH transmissions is multiplexed with ACK feedback to the at least one BS for one or more physical downlink shared channel (PDSCH) transmissions.

4. The method of claim 1, wherein the plurality of dummy PDCCH transmissions do not carry any downlink grants.

5. The method of claim 1, wherein the ACK feedback is scheduled in a same slot and with a same ACK resource indicator (ARI) value.

6. The method of claim 1, wherein the ACK feedback comprises multiple bits for each dummy PDCCH transmission, each of the multiple bits corresponding to a code block group (CBG) of the dummy PDCCH transmission.

7. The method of claim 1, wherein:
   the dummy PDCCH transmissions each include a dynamic downlink assignment index (DAI) counter value and a DAI total value;
   the DAI counter value increments with each of the plurality of dummy PDCCH transmissions; and
   the same DAI total is included in each of the plurality of dummy PDCCH transmissions.

8. The method of claim 7, wherein sending the ACK feedback comprises:
   sending an ACK at a corresponding DAI location in a UE hybrid automatic repeat request (HARQ) codebook when the PDCCH transmission including the DAI counter value is received; and sending a NACK at the corresponding DAI location in the UE HARQ codebook when a PDCCH transmission including the DAI counter value is not received.

9. The method of claim 7, further comprising:
receiving at least one normal PDCCH transmission carrying a downlink grant for a physical downlink shared channel (PDSCH) using at least one of the different transmission configurations and including a DAI counter value and the DAI total; and
transmitting ACK feedback at a corresponding DAI location in a UE hybrid automatic repeat request (HARQ) codebook for the PDSCH multiplexed with the ACK feedback for the plurality of dummy PDCCH transmissions.

10. The method of claim 1, wherein transmitting the ACK feedback comprises:
transmitting ACKs for only a subset of successfully received dummy PDCCH transmissions, wherein the subset is based at least in part on a measured signal quality associated with the PDCCH transmissions.

11. The method of claim 1, further comprising receiving multiple dummy PDCCH transmissions from the BS using at least one same transmission configuration, wherein the multiple dummy PDCCH transmissions using the same transmission configuration schedule ACK feedback for the same or different time instances.

12. The method of claim 1, wherein the plurality of dummy PDCCH transmissions are transmitted in a same or different time instance.

13. The method of claim 1, wherein the different transmission configurations comprise at least one of: different transmission configuration indicators (TCI), different transmission reception points (TRPs), different antenna panels, different beams, different channels, different control resource sets (CORESETs), or different quasi co-location (QCL) groups.

14. The method of claim 1, wherein the plurality of dummy PDCCH transmissions are received during a discontinuous reception (DRX) ON duration.

15. A method for wireless communication by a user equipment (UE), comprising:
receiving a configuration reserving one or more bits in a UE codebook for providing acknowledgment (ACK) feedback, wherein each reserved bit is for one or more control resource sets (CORESETs) associated with a same transmission configuration, and wherein different reserved bits are for different CORESETs associated with different transmission configurations;
monitoring a plurality of physical downlink control channel (PDCCH) transmissions from at least one base station (BS), the plurality of PDCCH transmissions using different transmission configurations and pointing to a same feedback opportunity; and
using the reserved bits to transmit ACK feedback in the feedback opportunity to the at least one BS for the plurality of PDCCH transmissions in the feedback opportunity.

16. The method of claim 15, wherein using the reserved bits to transmit ACK feedback comprises:
transmitting an ACK to the at least one BS using one of the reserved bits when a PDCCH transmission is successfully received in the corresponding CORESET, wherein the ACK is transmitted in the feedback opportunity using the reserved bit in the UE codebook for the CORESET; and
transmitting a NACK to the at least one BS using one of the reserved bits when a PDCCH transmission is not successfully received in the corresponding CORESETs, wherein the NACK is transmitted in the feedback opportunity using the reserved bit in the UE codebook for the CORESET.

17. The method of claim 15, wherein the plurality of PDCCH transmissions comprises a plurality of dummy PDCCH transmissions that do not carry a grant or comprises a plurality of normal PDCCH transmissions carrying grants.

18. The method of claim 15, wherein the ACK feedback is multiplexed with ACK feedback to the at least one BS for one or more physical downlink shared channel (PDSCH) transmissions.

19. The method of claim 15, wherein the different transmission configurations comprise at least one of: different transmission configuration indicators (TCI), different transmission reception points (TRPs), different antenna panels, different beams, different channels, different CORESETs, or different quasi co-location (QCL) groups.

20. The method of claim 15, wherein the ACK feedback comprises one bit for a PDCCH transmission comprising a multiple code block group (CBG).

21. The method of claim 15, wherein transmitting the ACK feedback comprises:
transmitting ACKs for only a subset of successfully received PDCCH transmissions, wherein the subset is based at least in part on a measured signal quality associated with the PDCCH transmissions.

22. The method of claim 15, further comprising:
receiving multiple PDCCH transmissions from the BS using a same transmission configuration, wherein the multiple PDCCH transmissions using the same transmission configuration schedule ACK feedback for the feedback opportunity; and
using one reserved bit to transmit ACK feedback to the at least one BS for the multiple PDCCH transmissions in the feedback opportunity.

23. A method for wireless communication by a base station (BS), comprising:
sending a plurality of dummy physical downlink control channel (PDCCH) transmissions to a user equipment (UE) for channel sensing, the plurality of dummy PDCCH transmissions using different transmission configurations and pointing to a same feedback opportunity; and
receiving acknowledgment (ACK) feedback from the UE for the plurality of dummy PDCCH transmissions in the feedback opportunity.

24. The method of claim 23, wherein the ACK feedback for the plurality of dummy PDCCH transmissions is multiplexed with ACK feedback from the UE for one or more physical downlink shared channel (PDSCH) transmissions.

25. The method of claim 23, wherein the plurality of dummy PDCCH transmissions do not carry any downlink grants.

26. The method of claim 23, wherein the different transmission configurations comprise at least one of: different transmission configuration indicators (TCI), different transmission reception points (TRPs), different antenna panels, different beams, different channels, different control resource sets (CORESETs), or different quasi co-location (QCL) groups.

27. The method of claim 23, further comprising:
selecting at least one of the different transmissions configurations to use for communications with the UE based on the ACK feedback.

28. A method for wireless communication by a base station (BS), comprising:

configuring a user equipment (UE) with one or more reserved bits in a UE codebook for providing acknowledgment (ACK) feedback, wherein each reserved bit is for one or more control resource sets (CORESETs) associated with a same transmission configuration, and wherein different reserved bits are for different CORESETs associated with different transmission configurations;

sending a plurality of physical downlink control channel (PDCCH) transmissions to the UE for channel sensing, the plurality of PDCCH transmissions using different transmission configurations and pointing to a same feedback opportunity; and receiving ACK feedback from the UE, for the plurality of PDCCH transmissions, via the reserved bits in the feedback opportunity.

29. The method of claim 28, where the plurality of PDCCH transmissions comprises a plurality of dummy PDCCH transmissions that do not carry a grant or comprises a plurality of normal PDCCH transmissions carrying grants.

* * * * *